United States Patent [19]

Moravec et al.

[11] Patent Number: 5,695,387

[45] Date of Patent: Dec. 9, 1997

[54] CSS MAGNETIC RECORDING HEAD SLIDER AND METHOD OF MAKING SAME

[75] Inventors: Mark D. Moravec, Gilroy; Tu Chen, Monte Sereno; Tracy L. Scott, Los Gatos; Kyou Haeng Lee, San Jose; Tsutomu Tom Yamashita, Milpitas; Tam Huu-Minh Nguyen, Santa Clara, all of Calif.

[73] Assignee: Komag, Inc., San Jose, Calif.

[21] Appl. No.: 394,661

[22] Filed: Feb. 21, 1995

Related U.S. Application Data

[63] Continuation-in-part of Ser. No. 957,535, Oct. 5, 1992, which is a continuation-in-part of Ser. No. 933,431, Aug. 19, 1992, abandoned.

[51] Int. Cl.$^6$ .............................. B24B 19/22; G11B 21/21
[52] U.S. Cl. .................................... 451/56; 451/5
[58] Field of Search ................... 451/41, 56, 57, 451/28, 5, 8, 9, 10, 905, 444, 550

[56] References Cited

U.S. PATENT DOCUMENTS

| | | | |
|---|---|---|---|
| 4,549,238 | 10/1985 | Ertingshausen et al. | 360/103 |
| 4,692,832 | 9/1987 | Bandara et al. | 360/137 |
| 4,870,519 | 9/1989 | White | 360/103 |
| 5,052,099 | 10/1991 | Taguchi et al. | 29/603 |
| 5,079,657 | 1/1992 | Aronoff et al. | 360/103 |
| 5,365,700 | 11/1994 | Sawada et al. | 451/28 |

FOREIGN PATENT DOCUMENTS

| | | |
|---|---|---|
| 54-23517 | 2/1979 | Japan . |
| 63-209082 | 8/1988 | Japan . |
| 2281485 | 11/1990 | Japan . |
| 3232174 | 10/1991 | Japan . |
| 432080 | 2/1992 | Japan . |
| 476875 | 3/1992 | Japan . |
| 4163774 | 6/1992 | Japan . |
| 5128468 | 5/1993 | Japan . |

OTHER PUBLICATIONS

Hockey, B., "Observations on Mechanically Abraded Aluminum Oxide Crystals by Transmission Electron Microscopy," Proceeding of the Symposium on the Science of Ceramic Machining and Surface Finishing, Nov. 2–4, 1970, Gaithersburg, MD, pp. 333–339.

Chandrasekar et al., "Comparison of Grinding and Lapping of Ferrites and Metals", ASME Journal of Tribology, vol. 109, May 1987, pp. 76–82.

Chandrasekar and Bhushan, "Friction and Wear of Ceramics for Magnetic Recording Applications—Part I: A Review", ASME Journal of Tribology, vol. 112, Jan. 1990, pp. 1–16.

Kinoshita et al., "The Surface Damaged Layer Study of Mn–Zn Single Crystal Ferrites using Magnetic Domain Observation Technique", Annals of the CIRP, vol. 25, No. 1, 1976, pp. 449–454.

Namba and Tsuwa, "Mechanism and Some Applications of Ultra–Fine Finishing", Annals of the CIRP, vol. 27/1, 1978, pp. 511–516.

(List continued on next page.)

*Primary Examiner*—Robert A. Rose
*Attorney, Agent, or Firm*—Jonathan A. Small

[57] ABSTRACT

Definition of the required geometry of the air bearing surface ("ABS") of a magnetic head slider is achieved while providing an ABS which exhibits low wear, low friction, and low stiction at its interface with a disk surface, by securely embedding monocrystalline diamond particles into a lapping plate, removing substantially all particles from the plate which are not firmly affixed thereto, and lapping the slider in a linear, X-Y direction at a relatively high lapping pressure. Material susceptible to being dislodged during CSS is removed during the lapping process. Thus, the incidence of material dislodging from the ABS and increasing wear-induced stiction is substantially reduced, resulting in improved CSS performance. A desired microtexture is also applied to the ABS. Reduced pole tip recession is also observed.

20 Claims, 14 Drawing Sheets

OTHER PUBLICATIONS

Namba and Tsuwa, "Ultra-Fine Finishing of Sapphire Single Crystal", Annals of the CIRP/ vol. 25/1, 1977, pp. 325–329.

VanderVoort, G., *Metallography—Principles and Practice*, McGraw-Hill Book Company, New York, 1984, pp. 95–97, 112–121.

Chandrasekar et al., "Surface Finishing Processes for Magnetic Recording Head Ceramics," Adv. In Info. Storage Syst., vol. 1, ASME Press, 1991, pp. 353–373.

Chen et al., "Surface Finishing Studies on Ceramics," Proc. 1991 NSF Des.+Mfg. Syst. Conf., Univ. Texas, Jan. 1991, pp. 187–191.

"Mypolex Micropolycrystalline Diamond Powder, the Ultimate Superabrasive", DuPont Industrial Diamond (no date avail.), advertising literature.

Bailey, "Unique Values of DuPont Mypolex Diamond Powder in Polishing Superhard Materials", 1988 Inter-Society Symposium, ASME/ACS/AES, Dec. 1, 1988, and attached Guidelines for Lapping and Polishing of Superhard Materials.

Namba and Tsuwa, "A Chemo-Mechanical Ultrafine Finishing of Polycrystalline Materials," Annals of the CIRP, vol. 28/1, 1979, pp. 425–429.

Samuel and Chandrasekar, "Effect of Residual Stresses on the Fracture of Ground Ceramics," J. Am. Ceram. Soc., vol. 72, No. 10, 1989, pp. 1960–1966.

Chandrasekar and Shaw, "Precision Crack-Off of Brittle Materials," Trans. of ASME, Journal of Engineering for Industry, vol. 110, May 1988, pp. 187–191.

Knowles, "The Effect of Surface Grinding Upon the Permeability of Manganese-Zinc Ferrites," Journal of Applied Physics D, vol. 3, No. 9, Sep. 1970, pp. 1346–1351.

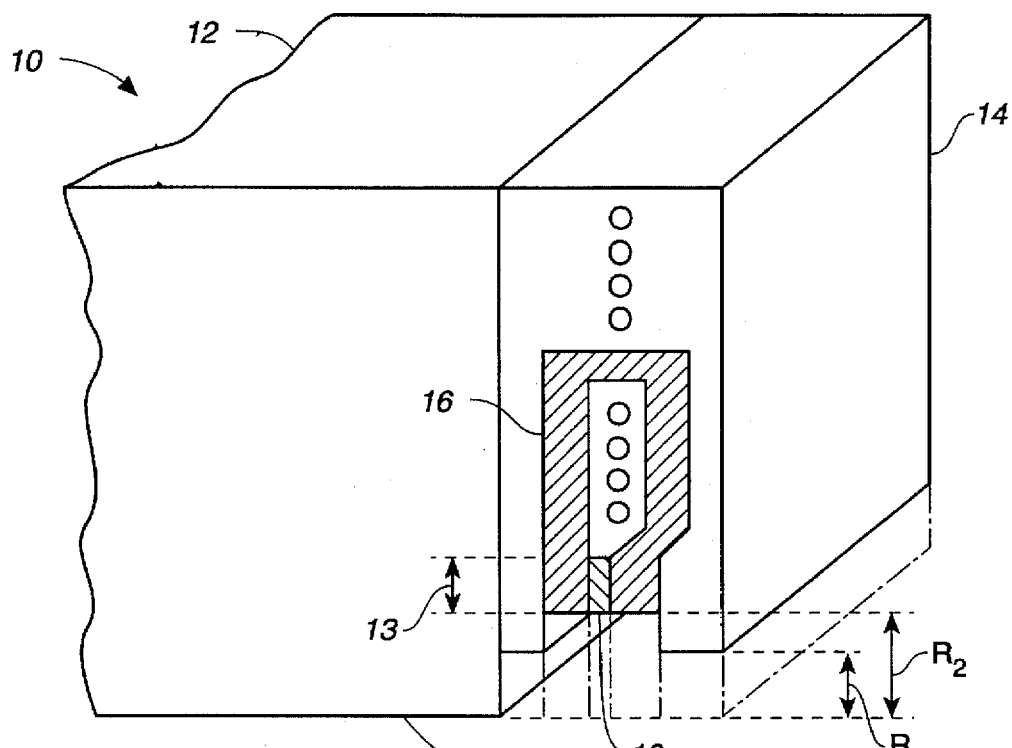
FIG._1
*(PRIOR ART)*
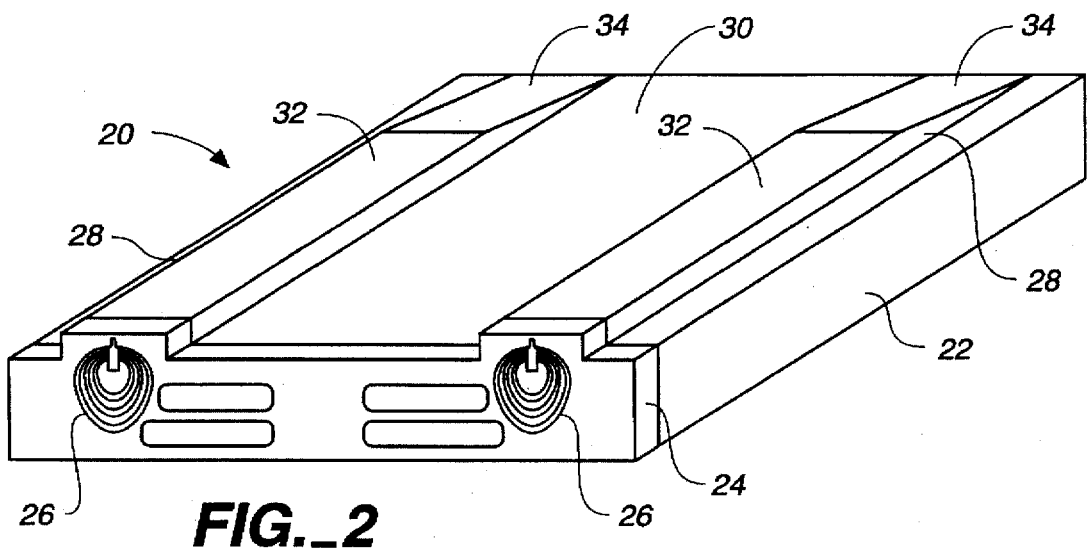
FIG._2

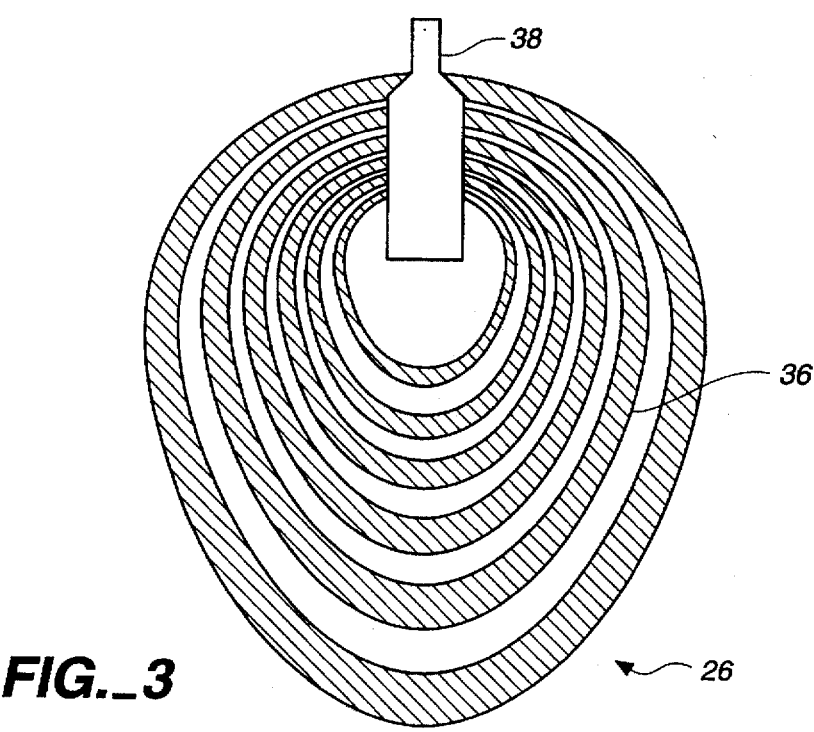
FIG._3
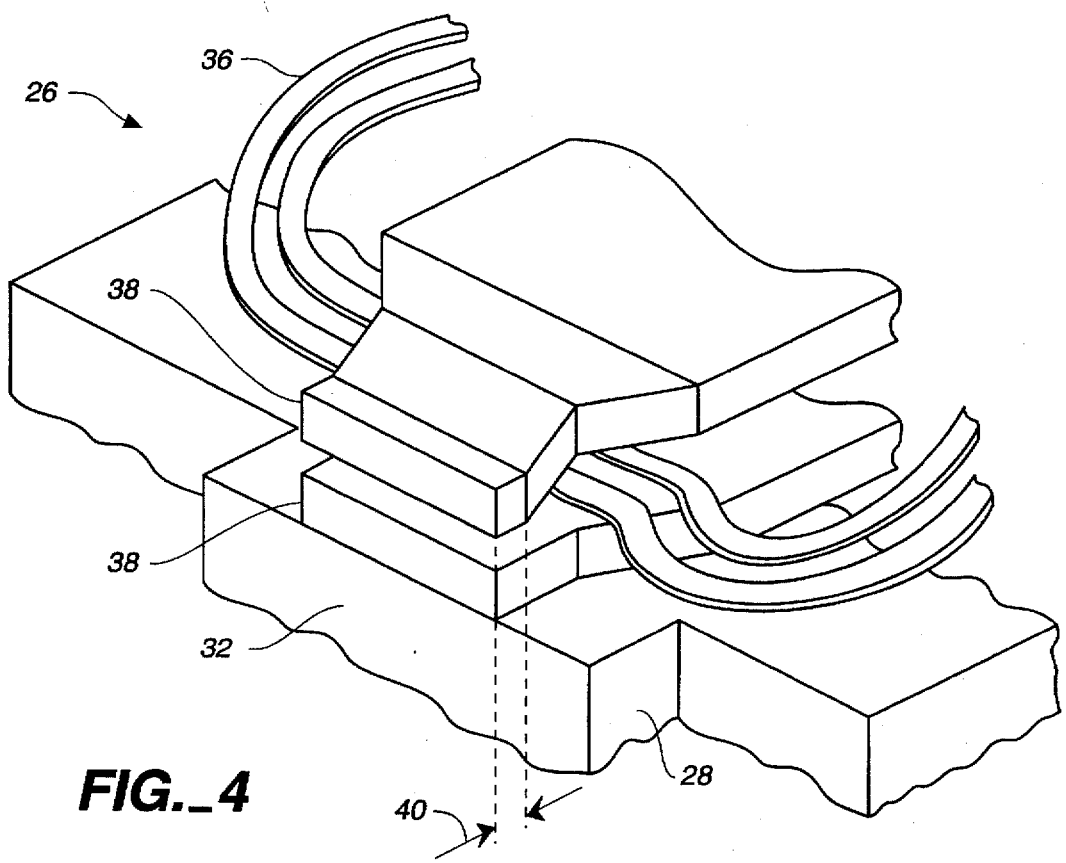
FIG._4

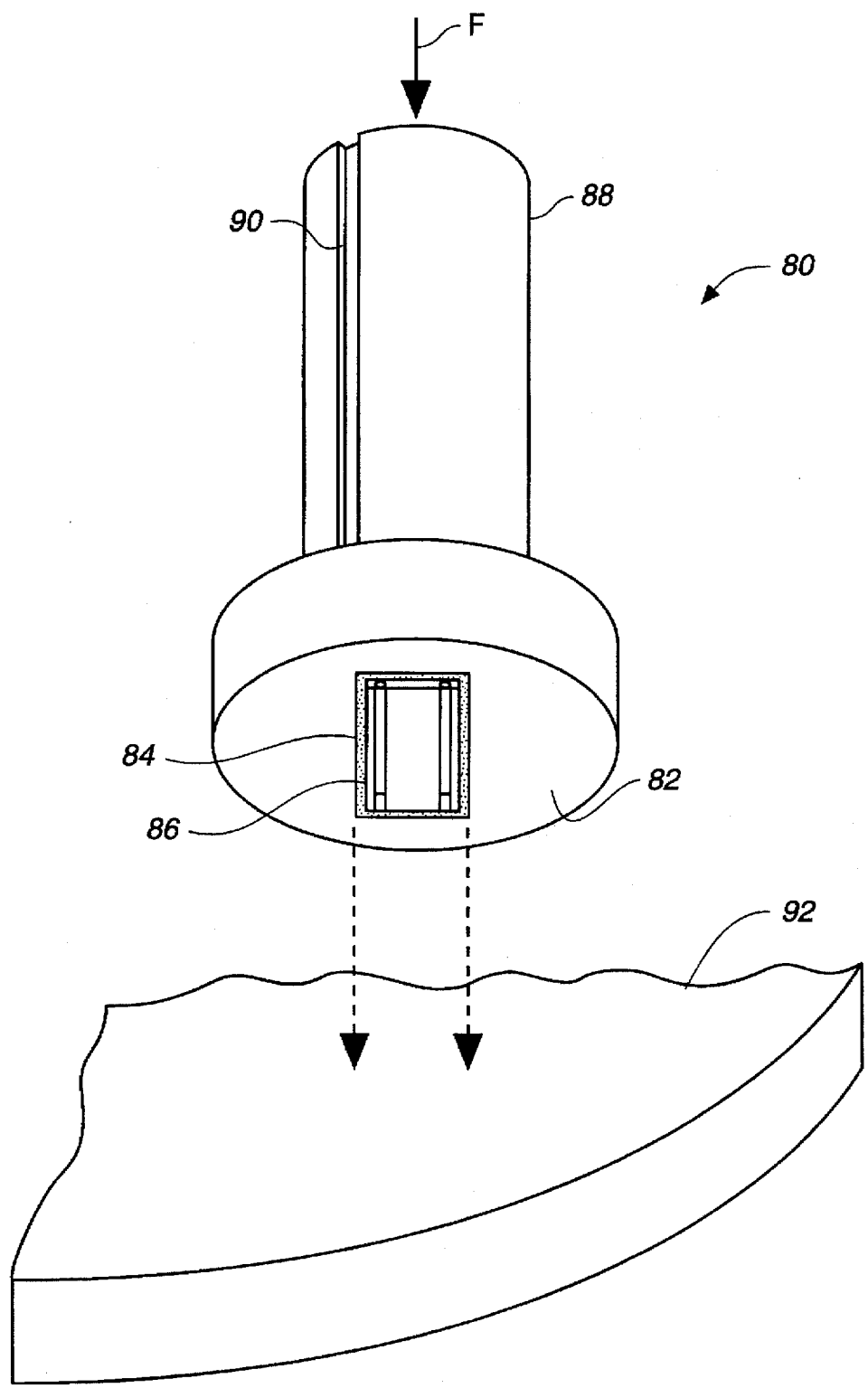
FIG._5

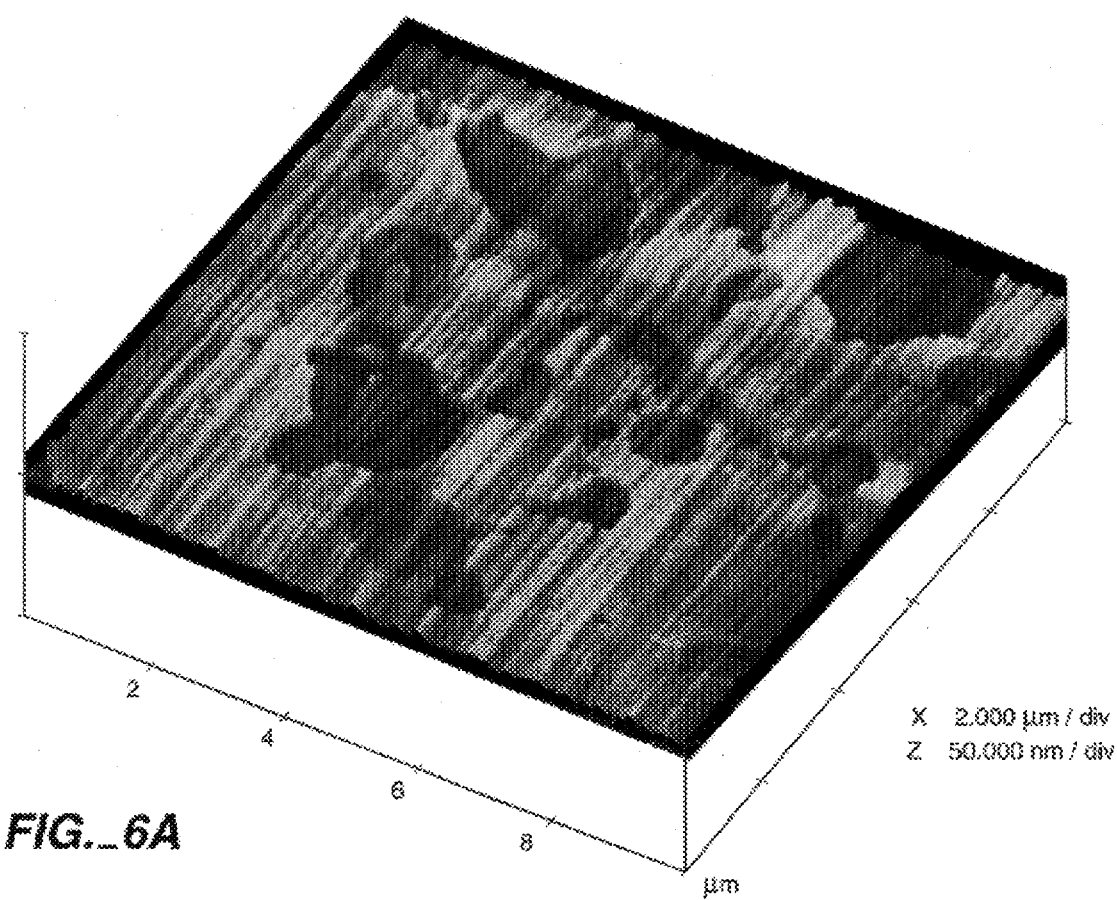
FIG._6A

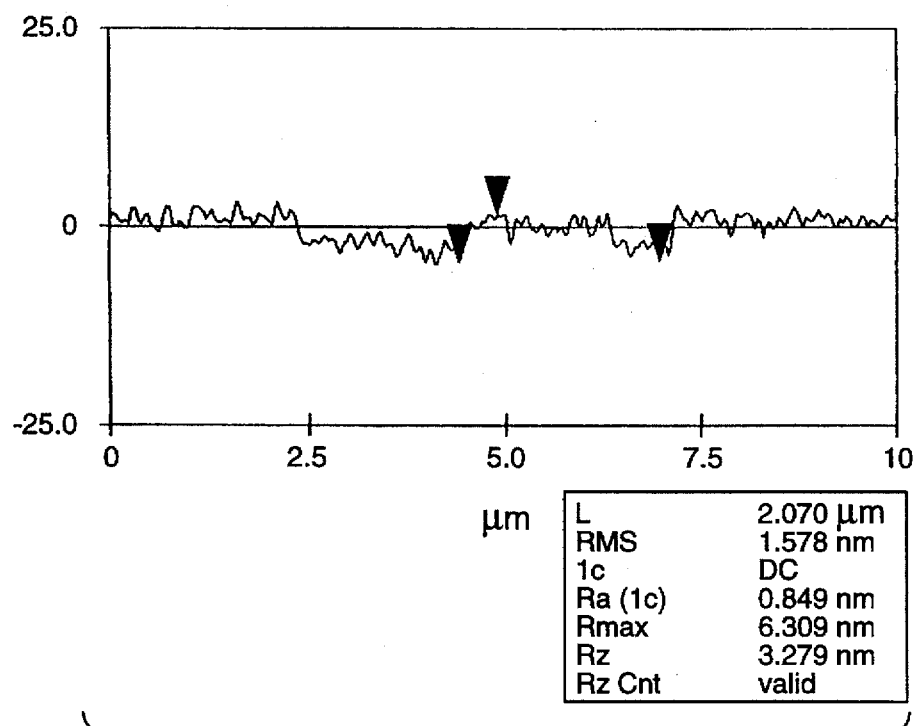
FIG._6B
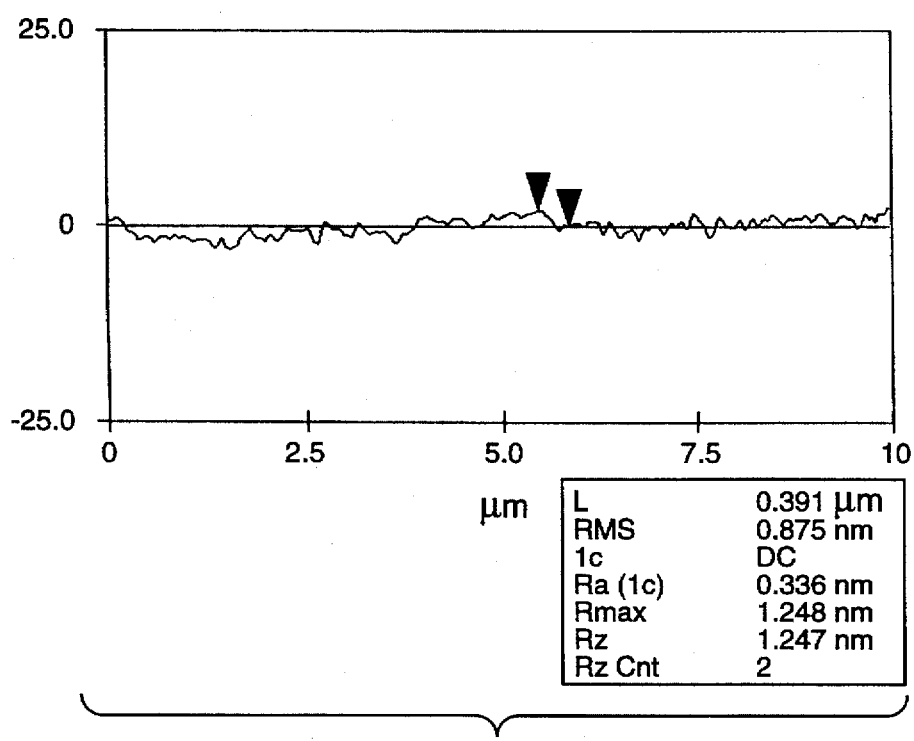
FIG._7B

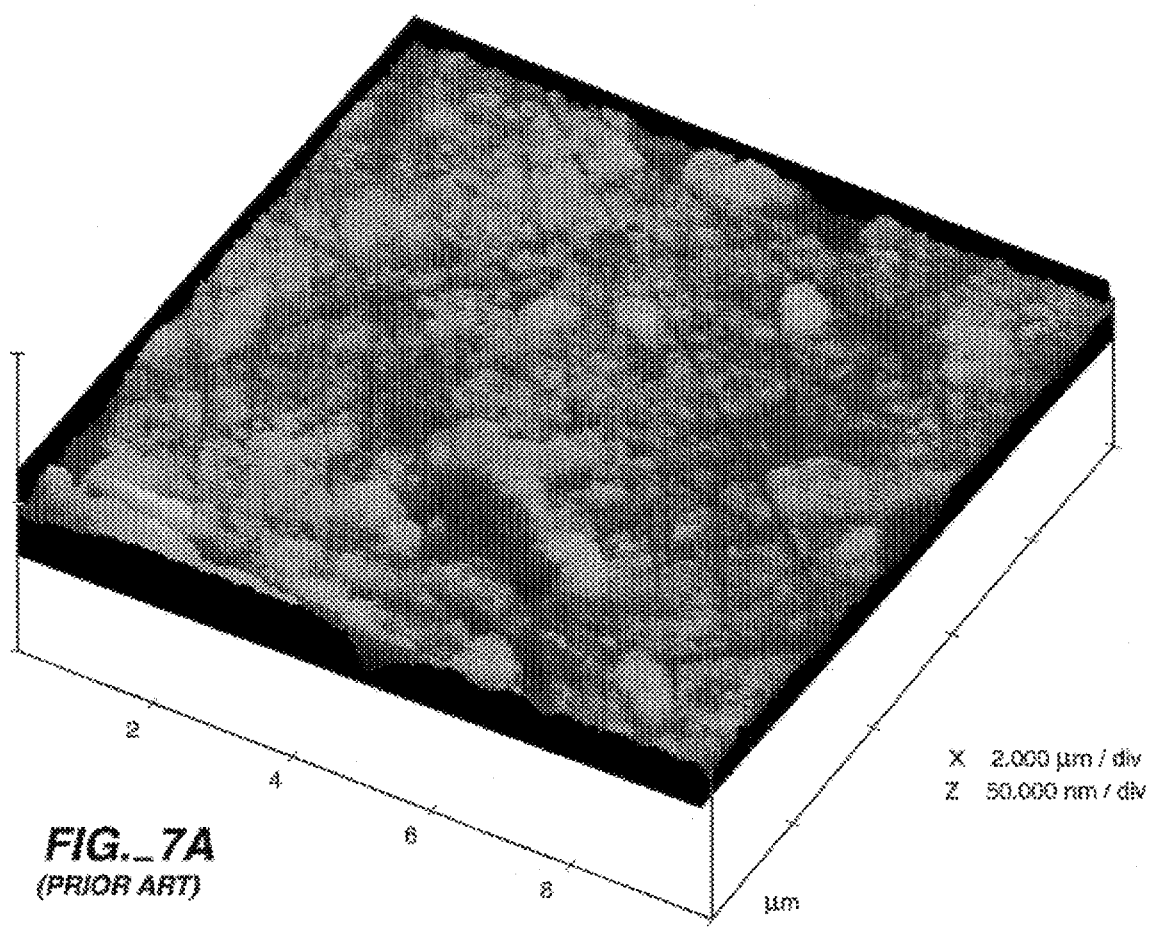
FIG._7A
(PRIOR ART)

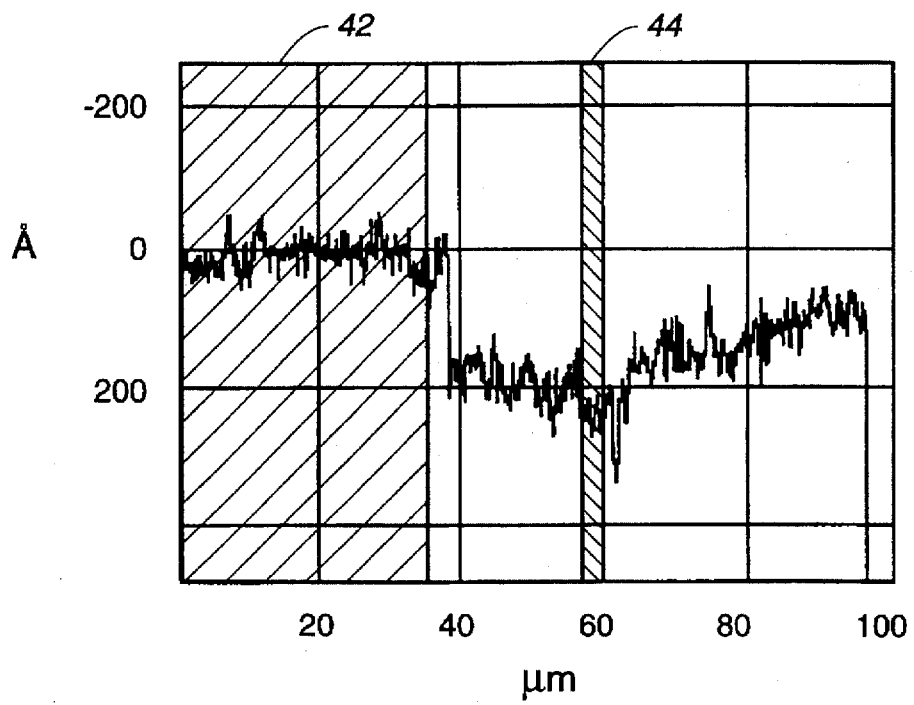
FIG._8
*(PRIOR ART)*
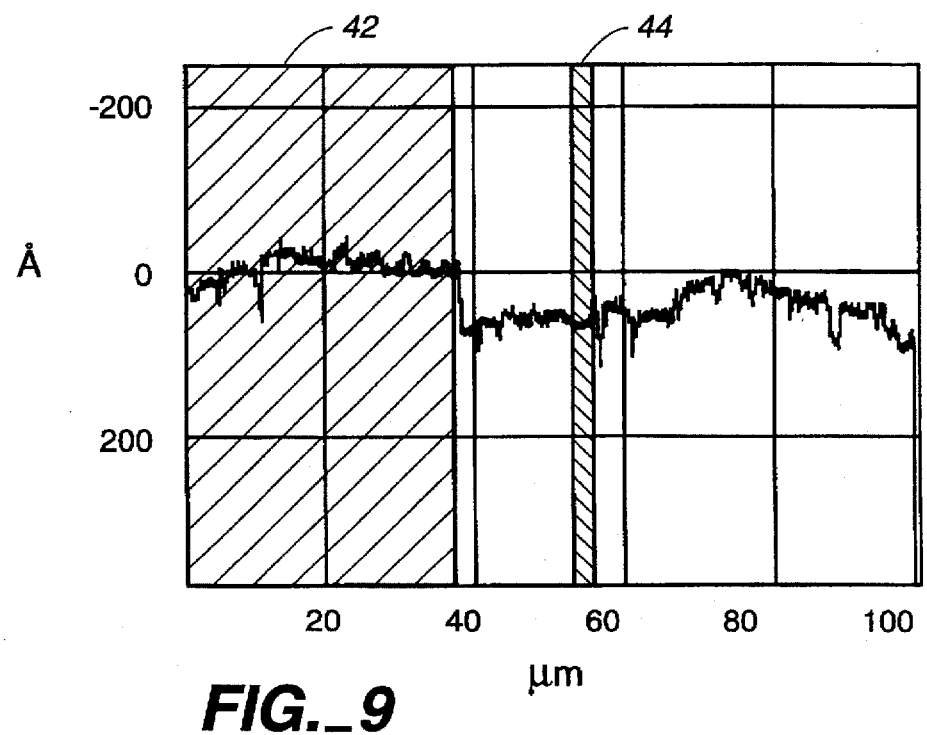
FIG._9

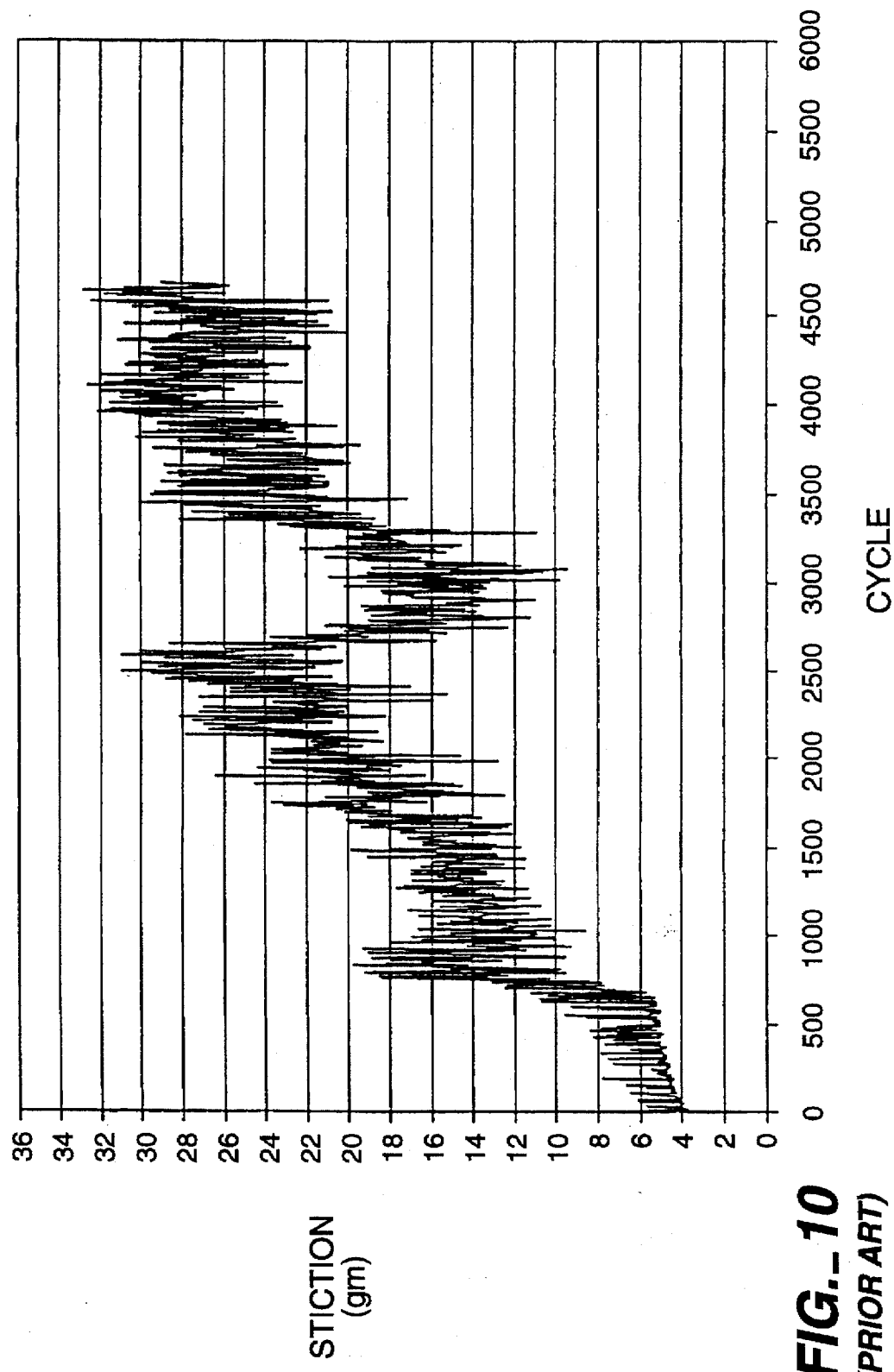
FIG._10
(PRIOR ART)

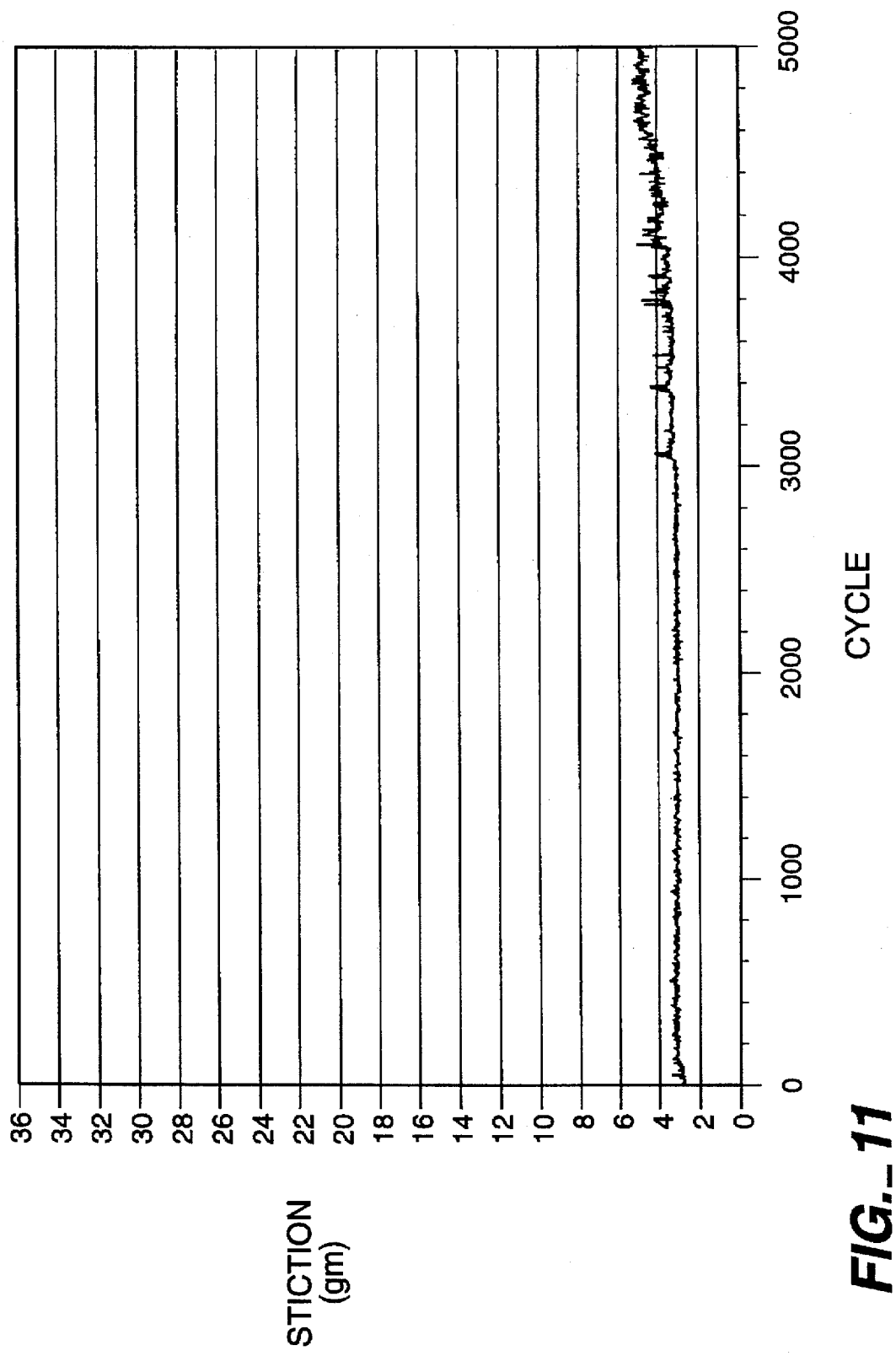
FIG._11

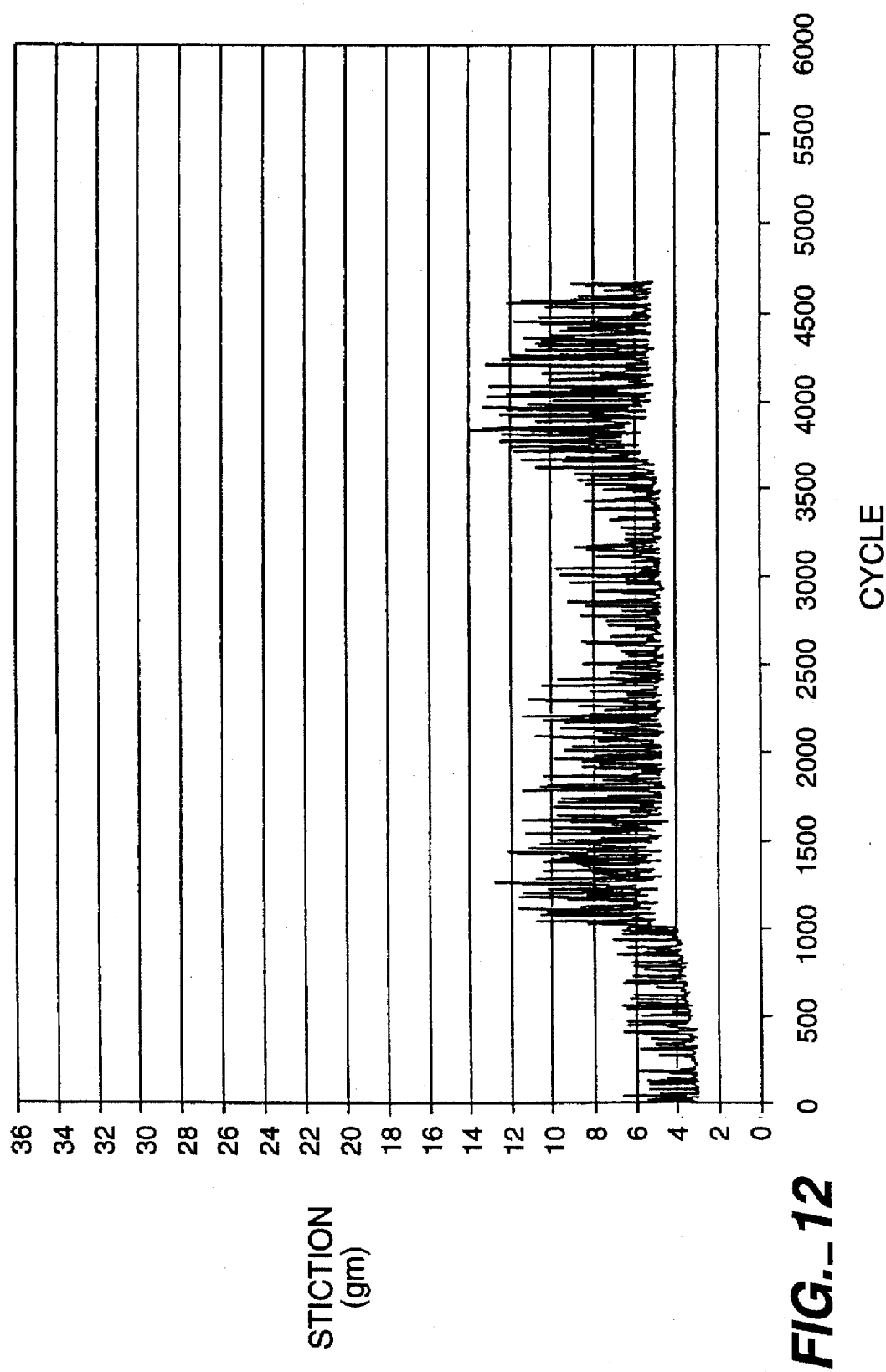
FIG._12

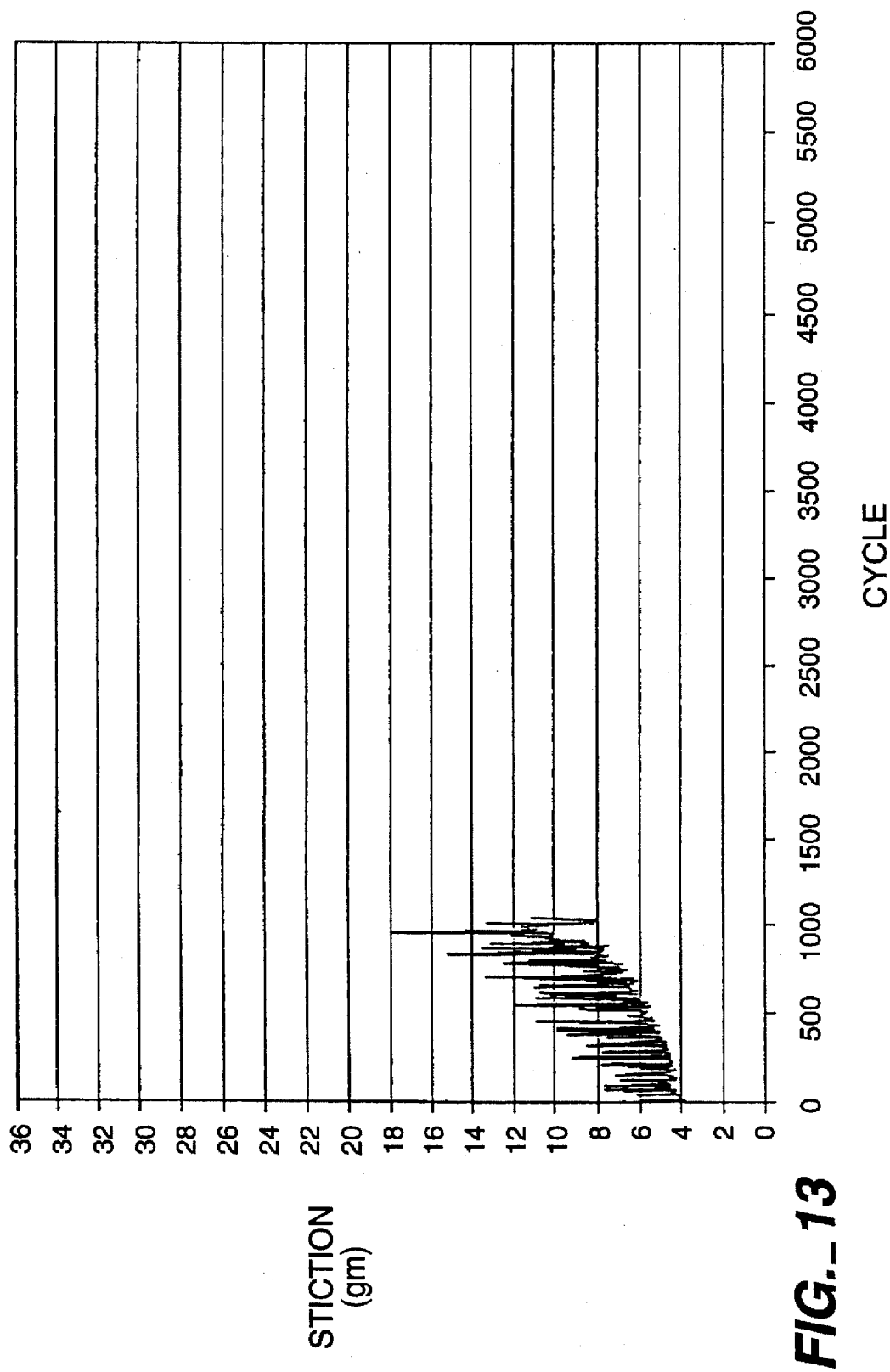
FIG._13

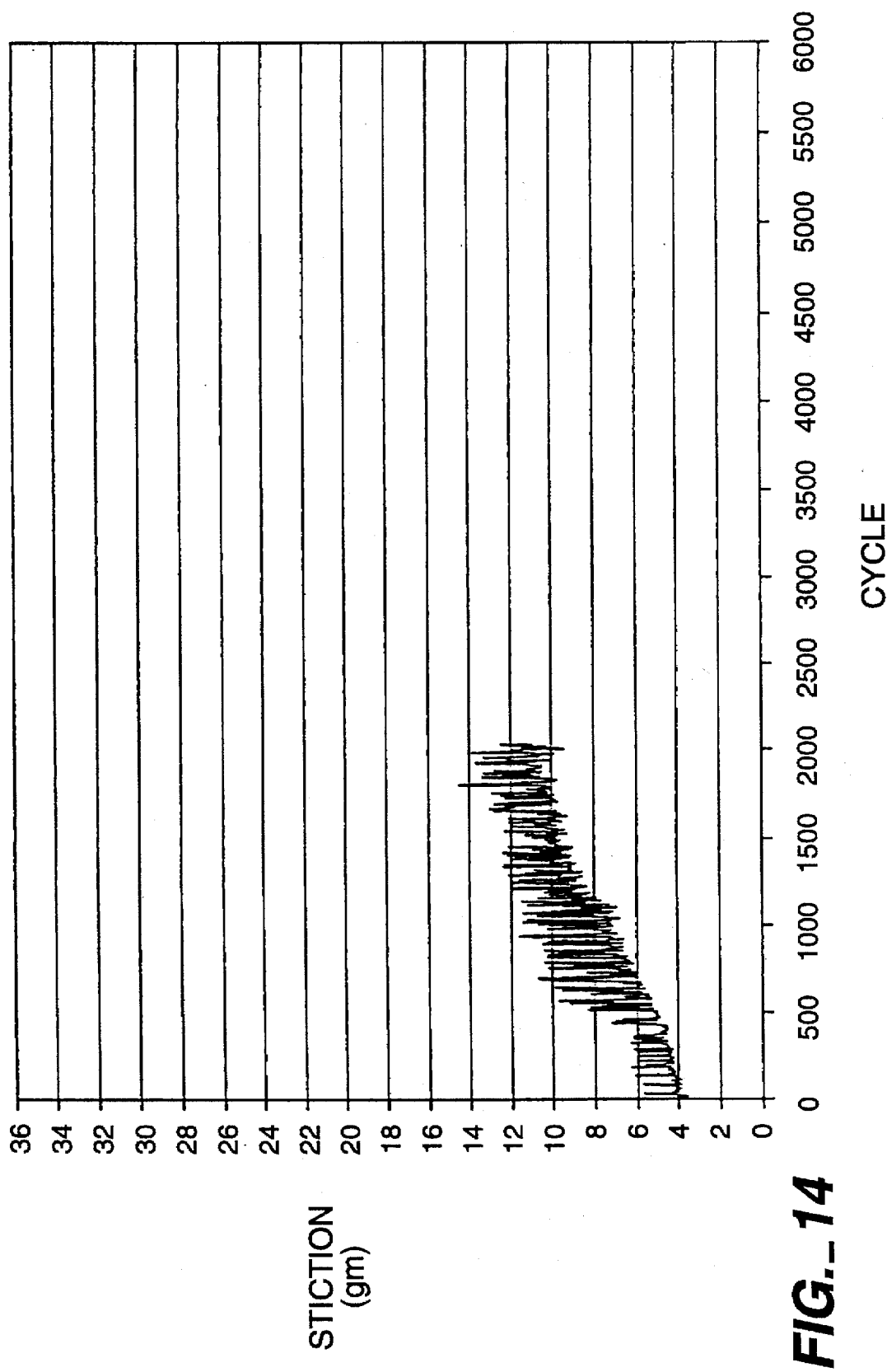
FIG._14

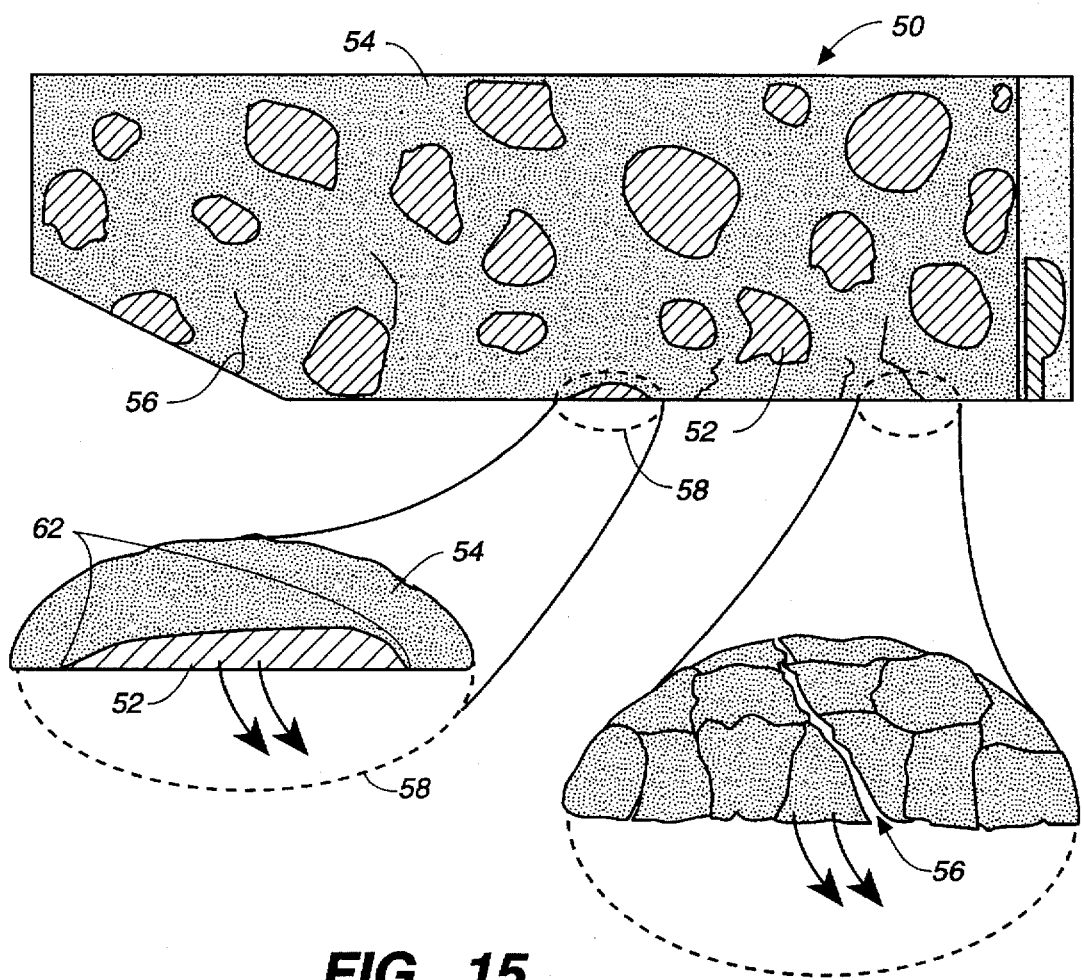
FIG._15
(PRIOR ART)

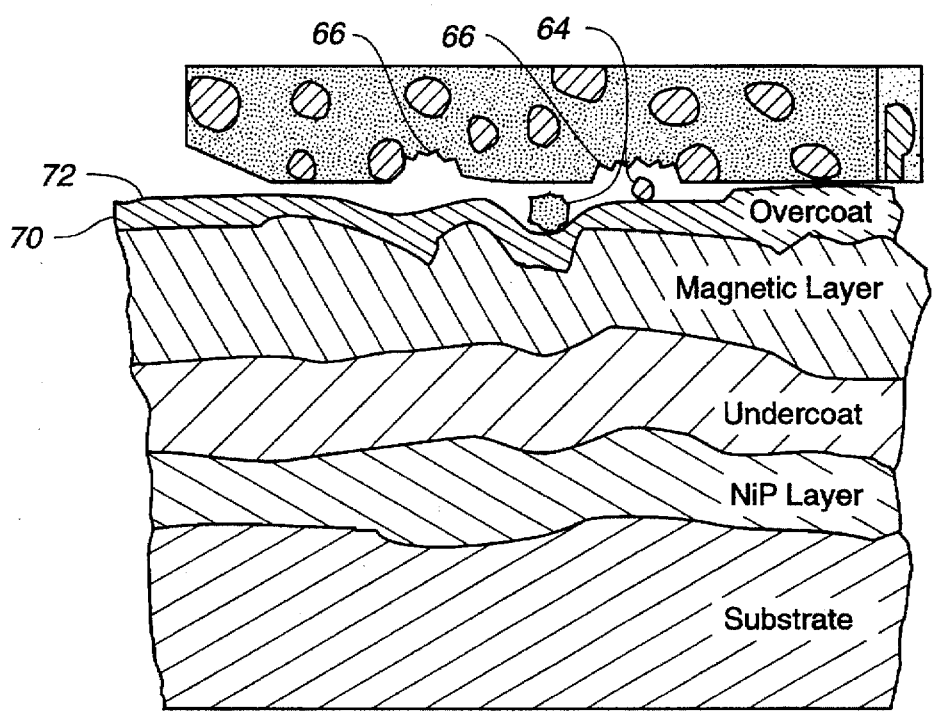
FIG._16
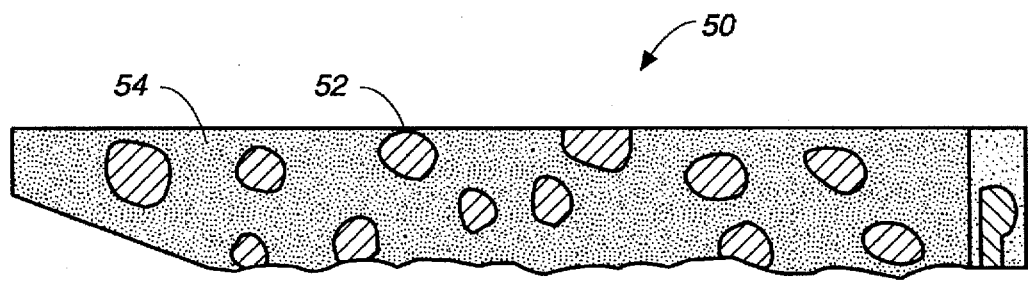
FIG._17

CSS MAGNETIC RECORDING HEAD SLIDER AND METHOD OF MAKING SAME

CROSS REFERENCE TO RELATED APPLICATIONS

This application is a continuation-in-part of application Ser. No. 07/957,535, filed Oct. 5, 1992, still pending, which is a continuation-in-part of U.S. patent application Ser. No. 07/933,431, filed Aug. 19, 1992 and now abandoned, each of which being assigned to the assignee hereof, and incorporated by reference herein.

BACKGROUND OF THE INVENTION

This invention relates to the manufacture of thin film magnetic recording head slider of the type commonly used in rigid magnetic disk drives. More particularly, the present invention is a process for manufacturing a thin film magnetic recording head slider using a glazed lapping plate having diamond particles securely embedded therein, which selectively removes material which is damaged and/or weakly bound to the slider's air bearing surface so as to minimize the quantity of such material which might be dislodged therefrom during use, while simultaneously creating a desired texture on the air bearing surface. Improved contact start-stop ("CSS") performance is obtained. Also, pole tip recession occurring during slider lapping is reduced, while at the same time reducing the cost of the lapping process.

In most modern rigid magnetic disk drives, a magnetic recording head slider ("slider") is carried by a suspension in close proximity to the surface of a rigid magnetic disk. The slider is designed to fly at close proximity to the disk surface on a cushion of air called an air-bearing, established by the disk's rotation. The geometry of the surface of the slider opposing the disk, referred to as the air bearing surface ("ABS"), controls to a great extent the flying characteristics of the slider. It is the manufacturing process of the ABS, and the resulting slider, that are the focus of our invention.

Currently, commercial sliders are formed on large wafers of substrate material. For example, photolithographic techniques are employed to deposit poles, coils, insulation, etc. onto ceramic wafers such as aluminum oxide-titanium carbide (70% $Al_2O_3$, 30% TiC). The wafers are then cut into rows of sliders for subsequent processing. Initially, rows of sliders may be subjected to grinding, ion milling or other processes to define ABS features such as rails, slots, and contours for air bearing performance, such as described by White in U.S. Pat. No. 4,870,519. Following the definition of these features, the ABS of each slider is commonly prepared by a three step lapping process: Rough Lap, Finish Lap, and Slider Lap. Rough Lap and Finish Lap are generally performed prior to cutting the sliders apart from rows, while Slider Lap is generally performed after cutting the individual sliders apart. See, e.g., "Surface Finishing Processes for Magnetic Recording Head Ceramics" by S. Chandrasekar et al., Advanced Information Storage Systems, Vol. 1, published by the American Society of Mechanical Engineers, pages 353 to 373 (1991) and "Surface Finishing Studies on Ceramics" by Chen et al., Proc. 1991 NSF Des. & Mfgr. Syst. Conf., Univ. of Texas, pages 187 to 191 (January, 1991), each of which being incorporated herein by reference. The purpose of the lapping process is to define the height of the pole tip in the final recording transducer in a direction perpendicular to the plane of the rigid disk surface, referred to as "throat height".

The goal of the Rough Lap step is to remove a relatively large quantity of material, on the order of 50 or more microns, quickly from the ABS to roughly define the throat height. To accomplish this goal, relatively large abrasive diamond particles, with a diameter on the order of 2.0–5.0 microns, are applied in a slurry between the ABS side of the row and a lapping plate which moves relative to the row of sliders. A force of up to 10 grams is applied between the row of sliders and the lapping plate while the row and the lapping plate are moved relative to one another. The diamond particles, either held by friction or loosely embedded into the lapping plate surface, are effective in cutting away ABS material to roughly establish the throat height of the sliders. However, while the size of the diamond particles used during Rough Lap are effective at quickly removing the ABS material, their size limits the accuracy with which the throat height may be defined. In addition, the diamond particles scratch the ABS, leaving it relatively rough—the larger the particles, the deeper the scratches. If the ABS is sufficiently rough, the disk surface wears during CSS, and the result of the wear is an increase in stiction between the ABS and disk surface. Wear-induced increase in stiction is perhaps the most common cause of failure in rigid magnetic disk drives.

The primary goals of the Finish Lap step are to more accurately define the throat height, to reduce the size of the scratches caused by the Rough Lap step, and to define the taper length and angle for the rail or rails of the ABS. Accordingly, relatively smaller abrasive diamond particles, with a diameter on the order of 0.25–1.0 microns, are applied in a slurry between the ABS side of the row and the lapping plate. A force of up to 10 grams is applied between the row of sliders and the lapping plate. The diamond particles, either held by friction or loosely embedded into the lapping plate surface, remove ABS material to more accurately define the final throat height. Approximately 7.0–10.0 microns of the ABS are removed by the Finish Lap step. In the process of removing ABS material to define the throat height, the smaller diamond particles used in the Finish Lap step reduce the size of the scratches caused by the Rough Lap step.

The rows are next cut into individual sliders. Due to residual stress in the body of the sliders when they are cut from the rows, the slider experiences a certain degree of camber (a rotation of the planes of the rails around the long axis of the rider) and twist (a rotation of the planes of the rails in a direction perpendicular to the long axis of the slider). Also, the ABS is typically given a degree of crown, or curvature, to assist in the slider's take-off as the disk begins to rotate. It is the primary goal of the Slider Lap step to establish the final geometry of the ABS, including removal or minimization of camber and twist, and definition of crown. Since the diamond particles of the Finish Lap step are of a size and hardness that they do still cause some surface scratches in the ABS, a secondary goal of the Slider Lap step is remove those scratches and further smoother the ABS. Accordingly, a yet smaller diamond particle, on the order of 0.1–0.25 microns, is applied in a slurry between the ABS and the lapping plate to accomplish the stated goals. Relative motion of the slider and the lapping plate, and a force of up to 10 grams applied between the slider and the lapping plate, causes removal of additional material from the ABS, resulting in a final ABS geometry, and a very smooth ABS.

In addition to the problem of surface scratches, the hard diamond abrasive particles used in lapping processes cause surface and subsurface stress or damage to the ABS, for example microcracking and dislocations, as described in detail in the aforementioned articles by Chandrasekar et al. and Chen et al. In ferrite sliders, the result of the stress or damage is development of a shallow magnetically inactive "dead layer", which effectively increases the spacing between the transducer and the recording medium, adversely affecting recording density and resolution. In non ferromagnetic sliders, the residual stress or damage may result in increased wear of the ABS and undesirable distortions of the ABS geometry. Thus, processes have been developed with an aim of minimizing the stress and damage caused to the slider during lapping. For example, it is the recommendation of both of the previously cited papers by Chandrasekar et al. and Chen et al. that successively softer abrasives of smaller size be used in lapping to yield reduced stresses and an improved surface finish.

A variation on these recommendations is the use in lapping of a polycrystalline diamond abrasive. The polycrystalline diamond abrasives are synthetic diamond particles having multiple, randomly oriented cleavage planes, as compared to a single parallel set of cleavage planes found in naturally occurring monocrystalline diamond particles. When subjected to high stress, the polycrystalline particles fracture in random directions into small particles along the cleavage planes, not along the parallel cleavage planes as would monocrystalline diamond. It is asserted that a fracture along the cleavage plane of a monocrystalline particle often leaves sharp corners or edges on the particle, which tend to cause deep and extensive damage perpendicular to the plane of the ABS (i.e., more subsurface damage). Polycrystalline diamond particles, however, are asserted to fracture along the random planes, reducing the incidence of sharp, pointed particles which produce deep vertical microcracking, and consequently such polycrystalline particles are asserted to cause reduced damage perpendicular to the ABS (i.e., less subsurface damage).

An example of polycrystalline diamond abrasive is Mypolex®, a trademark of E.I. du Pont de Nemours & Co. See, e.g., "Unique Values of Du Pont Mypolex® Diamond Powder in Polishing Superhard Materials", presentation materials from the "1988 Inter-Society Symposium: Machining of Ceramic Materials and Components", American Society of Mechanical Engineers et al., Dec. 1, 1988, incorporated by reference herein. While the manufacturer of Mypolex reports faster lapping and a smoother resulting surface finish, the polycrystalline diamond abrasive is significantly more expensive than the monocrystalline diamond abrasive. In addition, sliders lapped with polycrystalline diamond abrasives have not shown a significant improvement in CSS performance.

Despite the efforts of the prior art to produce a smooth and stress free ABS to reduce wear, prior art sliders continue to demonstrate high wear-induced stiction and less than optimal CSS performance. For example, FIG. 10 shows a typical CSS test result, performed on a 130 mm diameter thin film recording media with a sputtered carbon overcoat and lubricated with about 2 to 3 nm of perfluoropolyether lubricant. The test was performed by placing an $Al_2O_3$—TiC slider at a radius of 33 mm from the center of the disk. The slider was prepared by conventional diamond particle lapping as previously described, and had what was considered a very smooth ABS. The slider was 70% $Al_2O_3$ and 30% TiC by weight. Slider dimensions were those of a micro-slider, i.e., 2.1×2.8 mm, by 0.610 mm thick. A load of 11 grams was applied to the slider by the suspension.

FIG. 10 shows stiction values in grams force versus the number of CSS cycles. The disk was started from rest and spun up to 3600 rpm. The slider flew for several seconds, and then the motor was turned off and the slider was allowed to coast down to a stop. The spin-up took about 3 seconds, and spin-down took about 9 seconds. The process was repeated many times. The general increase in the slope of FIG. 10 indicates an increase in stiction due to wear as the number of cycles increases. The jaggedness of the curve represents widely varying stiction values from cycle to cycle, which illustrates non uniform wear of the disk surface.

The criteria for determining whether a disk and slider perform acceptably during CSS tests depend on a number of factors, including the type of drive being used. For example, some drives use more powerful motors which can tolerate a greater load than others. A typical requirement is that the "stiction coefficient", defined as the ratio of stiction force to normal load, is less than 1.0. By this definition, the above test of FIG. 10 would be a failure if the stiction value increased beyond 11 grams at any time up to 20,000 CSS cycles. Since the stiction shown in FIG. 10 increased to more than 30 grams in less than 5000 cycles, it is clearly unacceptable.

Since stiction is increased between a smooth disk and smooth ABS, various attempts have been made to texture or roughen the ABS to reduce stiction. For example, selected portions of the ABS have been sputter-etched to produce a desired roughness, as taught by Taguchi et al. in U.S. Pat. No. 5,052,099, or chemically or photolithographically etched, as taught by Aronoff et al. in U.S. Pat. No. 5,079,657. Another example is the selective removal of grains of TiC from the surface of a slider composed of 70% $Al_2O_3$ and 30% TiC by reactive ion etching, as taught by Ertingshausen et al. in U.S. Pat. No. 4,549,238.

Another approach to the problem of wear and stiction has been to reduce the so-called tribological current between the slider and the disk surface, as a correlation has been drawn between the tribological current and the incidence of slider-to-disk contact type drive failure. According to this approach, the slider-disk system is initially operated at low disk rotation velocities, such that the ABS is in sliding, mechanical contact with the disk surface, in a dry gas environment for a short period of time. This approach is taught by Bandara et al., in U.S. Pat. No. 4,692,832.

However, these methods of roughening or texturing the ABS suffer numerous disadvantages, including requiring large, sophisticated, and expensive fabrication equipment, requiring numerous additional process steps, and in fact may increase wear of the disk surface at the region of CSS. As a consequence, the manufacturing cost and complexity, and the possibility for processing error or damage to the slider or head during manufacturing are all increased. Hence there is a critical need in the art for a method of manufacturing a slider exhibiting reduced stiction and better CSS performance without the disadvantages of adding more expensive or more complex manufacturing steps.

In addition, the diamond particle abrasive processes known in the art invariably result in a certain amount of recession of the magnetic slider's NiFe (or "permalloy") pole tips, the $Al_2O_3$ located in the "gap" between the poles, and the $Al_2O_3$ head body. This condition is illustrated in FIG. 1, which is a cut-away side-view of a portion of a slider 10, comprising a slider body 12 and a magnetic head body 14, which have been prepared using a typical prior art diamond slurry lapping process. Since the NiFe material from which the poles 16 are formed is softer than the $Al_2O_3$ from which the head body 14 is formed (and the $Al_2O_3$ gap material 18 located in the gap between the poles is relatively very thin), the pole tips and gap material tend to recess to a greater degree ($R_2$) than the $Al_2O_3$ body ($R_1$), resulting in the stepped structure shown in FIG. 1. Since the magnetic spacing (the distance between the pole tips of the magnetic recording head and the mean thickness of the magnetic recording layer of the media) greatly affects recording density and bit resolution, this pole tip recession can undesirably degrade performance of the magnetic head slider. Consequently, there is an additional deed to develop a process for the production of sliders which exhibit improved CSS performance as well as reduced pole tip recession.

SUMMARY OF THE INVENTION

The present invention is a process for the manufacture of magnetic recording head sliders which exhibit reduced stiction and improved CSS performance. The present inventors believe that under certain circumstances, particulate material such as grains or portions of grains of the ABS material may become dislodged from the ABS during operation. Such particulate material then becomes a contributant in the wear system between the ABS and the disk surface. It is believed that the grains or portions of grains become dislodged from the ABS by two mechanisms: first, the lapping of the ABS causes inter-crystalline stress or damage at the boundary between two grains, which weakens the bond between the grains enough that one or more of the grains are readily removed from the ABS (e.g., by friction with the disk surface); and second, that the lapping process produces partial grains at the ABS, which reduces the contact surface area between grains, hence reducing the bond strength between the gains enough to permit the partial grain to dislocate from the ABS (again, for example by friction with the ABS). The process of the present invention selectively removes the stressed or weakly bound material from the ABS which might otherwise dislodged during operation. Accordingly, the resulting sliders exhibit improved material integrity during operation, leading to reduced wear-induced stiction and improved CSS performance.

In accordance with the present invention, a mechanical surface treatment method, referred to herein as "condition-lapping", is provided for the slider ABS which includes a Slider Lap step using a specially prepared lapping plate to selectively remove material from the ABS which might otherwise be dislodged therefrom during use. The lapping plate is prepared by deeply and securely embedding monocrystalline diamond particles into its surface, then extensively cleaning the lapping plate with the specific goal of removing any free particles of abrasive material that either may not have become sufficiently embedded in the plate or may have dislodged from the plate prior to lapping. The resulting lapping plate has a shiny surface as compared to lapping plates of the prior art immediately before use, and is therefore referred to herein as a "glazed plate".

According to the process of the present invention, a slider is positioned in contact with the glazed plate. A lubricant is introduced during the lapping process as the slider and plate are moved in a preset pattern relative to one another under a relatively high lapping pressure of 30–70 psi, preferably approximately 50 psi. The lubricant serves a secondary purpose of flushing out from the ABS/plate interface any particles which may become dislodged from the plate and any loose remnant material from the ABS generated during the lapping process.

Importantly, the hard, monocrystalline diamond abrasive particles in the glazed plate present sharp edges and corners to the ABS. These edges and corners condition the ABS by abrasively removing material which is damaged and/or mechanically weakly bound to the ABS which fight otherwise dislodge during use, and hence the process is referred to herein as "condition-lapping". The abrasive particle size and the parameters under which the condition-lapping is performed are specifically selected to allow lapping of the ABS while at the same time preferentially mechanically extracting gains or portions of grains which are stressed or weakly bound to the ABS or slider body, with minimal further surface and subsurface damage and weakening of material. Sliders which are condition-lapped show improved CSS performance, which is believed to result in part from the reduced incidence of grains or portions of grains dislodging from the ABS during CSS (which would otherwise dislodge and increase friction and wear-induced stiction). By selectively removing the damaged and weakly bound material, condition-lapping also creates a fine micro-texture on the slider surface, thereby reducing stiction, while presenting only mechanically strong material to the slider/disk interface.

In addition, the present inventors believe that free particles between the ABS and the lapping plate during lapping are prime contributants to pole tip recession. By extensively cleaning the glazed plate, and flushing the ABS/plate interface with lubricant during condition-lapping, the number of free particles at the interface are reduced, and thus pole tip recession is reduced.

Thus, the present invention is a method for preparing the ABS of a magnetic recording head slider in which hard, monocrystalline diamond abrasive particles which are rarely embedded into a glazed plate preferentially remove, under very high lapping pressure, damaged or weakly bound grains from the ABS which might otherwise dislodge during CSS, leaving a microtexture for reduced stiction. The process is capable of fully condition-lapping an ABS in two steps, and with monocrystalline abrasive particles. The process minimizes the presence of free particles between, the glazed plate and the ABS by extensively cleaning the glazed plate, by flushing the plate/ABS interface during condition-lapping, and by using non fracturable, monocrystalline diamond abrasive particles, to thereby reduces pole tip recess. This is to be compared to the prior art lapping processes, which: (a) provide smooth ABS, but do not preferentially remove damaged and weakly bound material from the ABS—and do not even realize the importance of doing so; (b) require three or more steps to lap and polish the ABS; (c) teach the use of the more expensive fracturable polycrystalline diamond abrasives; and (d) do not teach the extensive reduction of free particles at the ABS/plate interface during lapping to reduce pole tip recession.

Our invention permits a two step lapping process, including the steps of: (a) Rough/Finish lap, and (b) Slider lap. The Rough/Finish Lap step uses a monocrystalline diamond abrasive with a particle size between 0.25 and 2.0 microns, preferably 1.0 micron. The abrasive may be in the form of a slurry, as taught by the prior art, or to obtain improved reduction in pole tip recession, the abrasive particles may be embedded into a tin-antimony lapping plate. The Slider Lap step uses a monocrystalline diamond abrasive having a particle size between 0.1 and 0.25 microns, preferably 0.25 microns, embedded into a tin plate. In the Slider Lap step, or optionally both the Rough/Lap and Slider Lap steps, the slider is made to rub against the glazed plate with a force of between 30 and 70 psi, and preferably around 50 psi, to condition-lap the ABS. Thus, the number of separate lapping steps is reduced by removing the need for a highly polished and smooth ABS, the cost of lapping is reduced by permitting the use of monocrystalline diamond abrasive material, and pole tip recession is minimized by eliminating free abrasive particles.

In another embodiment, the slider and the glazed plate are made to move in physical contact with one another in a predetermined pattern. For example, the predetermined pattern may be linear X-Y motion with a predominance of one component, X or Y, of the linear motion, resulting in a figure "8" pattern.

The present invention is applicable to a variety of slider types and configurations. For example, the present invention is applicable to inductive and magneto-resistive head sliders, thin-film head sliders, single or multiple rail sliders, pressure compensating (e.g., negative pressure, TPC, etc.) sliders, monolithic or composite slider bodies, etc.

The present invention will become more apparent upon consideration of the detailed description below, read together with the accompanying drawings, in which:

BRIEF DESCRIPTION OF THE DRAWINGS

FIG. 1 is a cross-sectional view of a prior art magnetic head slider after lapping the ABS.

FIG. 2 is a perspective view of a magnetic head slider according to one embodiment of the present invention.

FIG. 3 is a plan-view schematic illustration of selected portions of an electromagnetic transducer head.

FIG. 4 is a perspective view schematic illustration of the electromagnetic transducer head shown in FIG. 3.

FIG. 5 is an illustration of a fixture employable to perform condition-lapping of a slider according to one embodiment of the present invention.

FIG. 6A is an AFM photomicrograph of a section of the ABS of a slider composed of approximately 70% $Al_2O_3$ and 30% TiC by weight according to the present invention.

FIG. 6B is a line profile from the AFM of the magnetic head slider of FIG. 6A.

FIG. 7A is an AFM photomicrograph of a section of the ABS of a prior art slider composed of approximately 70% $Al_2O_3$ and 30% TiC by weight.

FIG. 7B is a line profile from the AFM of the prior art magnetic head slider of FIG. 7A.

FIG. 8 is a line scan profile of a slider, illustrating pole tip recession following lapping of the ABS by a prior art process.

FIG. 9 is a line scan profile of a slider according to one embodiment of the present invention, illustrating a reduction in pole tip recession after lapping of the ABS as compared to the prior art.

FIG. 10 shows a typical CSS test result, performed on a prior art 130 mm diameter thin film recording media with a sputtered carbon overcoat and lubricated with about 2 to 3 nm of perfluoropolyether lubricant.

FIG. 11 is a CSS test result for a slider condition-lapped by the processes of the present invention.

FIG. 12 is a CSS test result for a slider lapped by 0.5 micron diamond particles embedded on a tape for approximately 4750 cycles over a 12.7 mm stroke distance.

FIG. 13 is a CSS test result for a slider lapped by 0.1 micron diamond particles embedded on a tape, with a 12.7 mm stroke distance.

FIG. 14 is a CSS test result for a slider lapped by 0.1 micron diamond particles embedded on a tape, with a 12.7 mm stroke distance, with the additional step of introducing water and ethylene glycol between the tape and the ABS to act as a lubricant during lapping.

FIG. 15 is a schematic representation of a cross section of an $Al_2O_3$—TiC slider after diamond lapping according to the prior art.

FIG. 16 is a schematic representation of a cross section of an $Al_2O_3$—TiC slider during CSS.

FIG. 17 is a schematic representation of a cross section of an $Al_2O_3$—TiC slider, where condition-lapping has removed damaged and mechanically weak ABS material.

As between each of these figures, like reference numerals shall denote like elements.

DETAILED DESCRIPTION

Referring to FIG. 2, there is shown therein a complete two-rail magnetic head slider 20 of generally rectangular shape, according to one embodiment of the present invention. Slider 20 comprises two portions, a slider body portion 22 and a thin-film magnetic head body portion 24 within which one or more electromagnetic transducer recording and/or reading heads 26 are formed.

Body portion 22 comprises, in general, two parallel rails 28 on opposite sides of a recessed face 30. An exposed surface 32 of each rail 28 constitutes the ABS of slider 20. At the end of ABS 32 opposite the magnetic head body 24 is an air-bearing taper 34 which is slightly inclined with respect to the plane of rail surface 32. Rails 28, ABS 32 and taper 34 are all important structural features which are very precisely shaped to enable slider 20 to fly at a close distance from the magnetic disk surface.

Slider body portion 22, which constitutes the bulk of thin film head slider 20, is typically made of a composite ceramic material which is a mixture of $Al_2O_3$ and TiC. However, other suitably hard materials can be used. Magnetic head body portion 24 is typically comprised of $Al_2O_3$ in which one or more electromagnetic transducer heads 26 are encapsulated.

With reference now to FIGS. 3 and 4, each head 26 consists of a coil 36, of a conductor such as copper, and poles 38, of a suitable ferromagnetic material such as NiFe ("permalloy"), defined by a photolithographic process. Poles 38 extend axially a distance beyond the outer circumference of coil 36, and terminate at their distal ends at surface 32 of rails 28. This distance 40, referred to as the "throat height" of the head, is a critical dimension in determining the read and write functionalities of slider 20. Typically, the throat height 40 will be on the order of about 1000 nm.

As previously discussed, the ABS 32 will be lapped to define the throat height, fine surface geometry, etc. Throat height is generally controlled to a tolerance of less than one micron. The geometric parameters have important consequences for the flying characteristics of slider 20 as well as its CSS performance, and are usually controlled to within several nanometers. The precise throat height and geometric requirements place great demands on the lapping technique. Diamond particle abrasives are an ideal material for precise lapping and polishing of ABS 32 due to their extreme hardness and the speed at which the diamond removes the ABS material.

While a diamond particle abrasive is preferred for ABS geometry definition, the diamond particle abrasives leave micro-scratches on the ABS, and can cause surface and subsurface damage to the body of the slider. In general, the larger the diamond particles used in lapping, the faster the ABS geometry may be defined, but also the larger and deeper the micro-scratches and the greater the extent of the surface and subsurface crystalline damage. The smoothness or roughness of the ABS can be precisely controlled, but with the toll of adding additional process steps and increasing the cost of the process. The following Table 1 summarizes the lapping conditions of common prior art processes.

TABLE 1

|  | Abrasive Particle Type | Particle Size | Lapping Pressure |
|---|---|---|---|
| Row Rough Lap | monocrystalline diamond | 2–5 microns | 6–10 psi |
| Row Finish Lap | polycrystalline diamond | 0.25–1.0 microns | 6–10 psi |
| Slider Lap | polycrystalline diamond | 0.1–0.25 microns | 6–10 psi |

In contrast to the conditions shown in Table 1, the condition-lapping process of one embodiment of the present invention begins with a combined Rough/Finish Lap of an ABS. A Sn—Sb, ceramic or other suitable lapping plate is cleaned and a slurry containing 1.0 micron monocrystalline diamond abrasive particles is applied to its surface. Rows of sliders are then positioned on a retaining block, and their ABS positioned in mechanical contact with the lapping plate. With the abrasive slurry flowing between the ABS and the lapping plate, the row of sliders and the lapping plate are moved relative to one another. Lapping pressures at this point may be in the region of 10 or more psi. The lapping time is sufficient to remove approximately 50 microns from the ABS, on the order of 15 minutes, to define the throat height. The rows of sliders are then removed from the lapping apparatus and the retaining blocks, cleaned, and cut by diamond saw or other means into individual sliders. It should be noted, however, that separate steps of Rough Lap and Finish Lap performed under conditions similar to the above, may be performed in appropriate circumstances.

In one embodiment, the glazed plate for the Slider Lap step is prepared as follows. The plate used in the Slider Lap step of the condition-lapping process consists of an alloyed layer of 97.5% tin and 2.5% antimony on top of an aluminum base plate. (1) The plate was charged by applying approximately 10 cc of a paste of 0.25 micron monocrystalline diamond particles suspended in a water soluble carrier which is widely commercially available in the industry. The paste was rubbed by hand to coat the plate. (2) A cleaned ceramic ring having a relatively small surface area for contact with the plate was next placed on the plate surface, and a weight of approximately 15 pounds applied on the ring. (3) The plate and ring were then rotated in planetary-type motion at approximately 72 rpm relative to one another for approximately 5 minutes. No vehicle or slurry was applied to the interface (other than the paste previously applied) during this step. (4) The frog was then ultrasonically cleaned and dried and returned to the plate. (5) The plate and ring were again rotated in planetary-type motion at approximately 72 rpm relative to one another for approximately 15 minutes with a vehicle of atomized de-ionized water and ethylene glycol (approximately 70/30) applied to the interface to carry away any abrasive particles not firmly embedded in the plate surface. (In an alternative embodiment, a corrosion retardant may also be applied to the plate during the charging process.) (6) The plate surface was then hand-wiped with a cotton-twill wipe and a vehicle of de-ionized water and ethylene glycol until no visible abrasive material remained on the surface.

The glazed plate was then qualified by a trial condition-lapping of a slider (by the process described below). The trial slider was then inspected for any visible surface scratches at 200× magnification, and for proper cut rate, crown, camber, twist, and pole tip recession. If the glazed plate failed to qualify under any of these criteria, the ring and 15 pound weight would have been returned to the plate, and the plate and rings would have been rotated again relative to one another for an additional one-half hour, with the application of the atomized vehicle. The plate would have been re-cleaned by hand and a trial slider lapped. This re, conditioning would proceed until the glazed plate qualified.

Each slider is placed on an appropriate fixture with a specific orientation. For example, FIG. 5 illustrates a slider retainer 80 comprising a retaining surface 82 having a slider receiving region 84 formed therein. A slider 86 may then be positioned in region 84 with a predetermined orientation. Slider 86 could be tacked to region 84, or otherwise retained in region 84. For flexibility and ease, region 84 may be comprised of an elastic material with a surface sufficient for adhering the slider. In this way, slider-to-slider variations in geometry, e.g., rail height, flatness, etc., may be accommodated. When slider retainer 80 is properly oriented, for example by way of a channel 88 located in shaft 90, the slider may be lapped in a predetermined pattern against lapping plate 92. The fixture is capable of receiving a force F which is transmitted to the ABS-lapping plate interface, for example by applying a weight to the end of the retainer 80 opposite the retaining surface 82.

Condition-lapping then proceeds with the plate fixed, and the fixture carrying the sliders moving relative to the plate. The region of the plate to be used for condition-lapping is coated with a vehicle such as the aforementioned water/ethylene glycol mixture. The slider retainer is then mounted on an appropriate reciprocating apparatus, with the fixture positioned such that the slider is in touching contact with the glazed plate. A high pressure of approximately 50 pounds per square inch (psi) is applied to the sliders via the retainer. The sliders, are then reciprocated in a very narrow, roughly figure "8" motion at a rate sufficient to obtain approximately 500–1000 Å per minute removal of material from the slider. An important point is that the surface abrasion be predominantly in a single, linear direction. During this Slider Lap step, a carrier is applied at the slider/plate interface to lubricate the process and remove loose particle of material lapped or dislodged from the ABS or diamond particles which have come loose from the glazed plate.

It should be noted that a choice of particle size and hardness is permitted in preparing the glazed plate. The larger or harder abrasive particle or grain will enable one to perform surface treatment more rapidly and therefore less expensively. However, to a degree a larger or harder particle or grain will also impart a deeper texture to the ABS, cause increase surface and subsurface damage, and possibly result in an increase in pole tip recession. Thus, there is an engineering tradeoff between speed, texture depth, surface and subsurface damage, and pole tip recession. Therefore, one can modify grain or particle size and hardness, depending on which of these issues (process speed, texture depth, extent of damage or pole tip recession) is of greater concern.

The slider condition-lapped in accordance with the above process demonstrates several unique qualities, as seen by comparing FIGS. 6A and 6B showing a surface micrograph and a cross-sectional line profile, respectively, of an ABS manufactured according to the present invention, with FIGS. 7A and 7B, showing a surface micrograph and a cross-sectional line profile, respectively, of an ABS manufactured according to conventional techniques known in the art. In FIG. 6A and 7A, regions of varying depth of the surface are indicated by their shade—the deeper regions are shown as darker.

First, the slider of FIG. 6A exhibits randomly positioned, relatively large, abrupt, and well defined depressions, representing regions or voids where material has been removed. These voids are seen as dark spots in FIG. 6A, and as relatively deep depressions in FIG. 6B, and are not seen in the slider manufactured according to conventional techniques shown in FIGS. 7A and 7B. (Preferable, these voids are 1–5 nm in depth as measured from the ABS, although they may be deeper in appropriate cases.) The bond between the material once present in these voids and the balance of the ABS was insufficient to retain the material in place during condition-lapping. The fact that the condition-lapping process dislodged the material from the ABS demonstrates that the material might likely have dislodged from the ABS during use and contributed to wear. Thus, there is a substantially reduced likelihood that material will dislodge from the ABS during use, and the resulting CSS performance will be significantly improved.

Second, the slider exhibits uniform, parallel surface scratches. With reference to FIG. 7A, it can been seen that the surface of the slider shown therein exhibits randomly oriented and narrow scratches, imparted from the planetary-like relative motion between the slider and the lapping plate during the lapping process. We have discovered that these randomly oriented and narrow scratches have sharp edges or corners which are sites of high stress concentration. Such stress concentrations often lead to portions of the ABS material breaking off of the ABS, which as has previously been discussed leads to increased friction and wear. Also, such scratches tend to increase wear of the disk surface.

The surface shown in FIG. 7A exhibits relatively few large dark regions. This means that the ABS exhibits a relatively small variation in surface depth, which is verified by the line-profile of FIG. 7B. The line profile shows that the surface depth only slightly varies across the surface, with few significantly large changes in depth. The Ra (a combination of both low frequency and high frequency roughness) for this slider was measured at 0.336 nm. This data is as would be expected for a "smooth" ABS. In summary, the surface shown in FIG. 7A is relatively planar and smooth, with randomly oriented surface scratches of varying depth.

With reference now to FIGS. 6A, it can been seen that the surface of the slider shown therein exhibits predominantly parallel and reasonably wide surface scratches, due to the linear lapping motion. Again, the darkness of the scratches indicates their depth, so that the scratches in the ABS of FIG. 6A are fairly uniform in depth. The width and the uniformity of the scratches shown in FIG. 6A have been found to lead to a reduced concentration of stress, and hence a reduction in the mount of material that breaks off of the ABS due to such stress. Also, the parallel orientation of the scratches tends to produce reduced wear of the disk surface. Consequently, an ABS having the scratch characteristics of FIGS. 6A and 6B exhibit reduced friction and wear.

The third unique aspect of the slider manufactured according to the present invention is that it exhibits a microtexture. Again, it will be noted that the surface shown in FIG. 6A exhibits several large dark regions, indicating regions of varying surface depth. These regions of large variation in surface depth are identified in the line-profile of FIG. 6B as sharp depressions in the otherwise reasonably flat surface profile. The combined Ra for this slider was measured at 0.848 nm. Thus, these voids impart a very fine and irregular microtexture to the ABS, on the order of 3–5 nanometers deep, which contributes to a reduction in stiction.

A fourth unique aspect of the slider manufactured according to the present invention is the reduced pole tip recession as compared to equivalent prior art processes. The profile for a portion of two sliders, one manufactured according to the prior art and one manufactured according to the above described invention are shown in FIGS. 8 and 9, respectively. The slider manufacturing steps were the same for each slider up to the Slider Lap step. With regard to FIG. 8, the $Al_2O_3$—TiC body portion of the slider is indicated by the dashed region 42, the permalloy poles and $Al_2O_3$ gap material are indicated by dashed region 44, and the remaining regions represent the $Al_2O_3$ head body. It will be seen that the average pole tip recession for this head is approximately 234 Å, with a peak recession of approximately 268 Å. Table 2 illustrates the pole tip recess and statistical data for a sample of sliders manufactured by the prior art (in the column labeled "Prior Art").

It will be noted that the average pole tip recession of the slider shown in FIG. 9 is approximately 71 Å, with a peak of approximately 140 Å. Importantly, it should also be noted that the recession across the entire thin film magnetic head shown in FIG. 9 is much more uniform than that of the slider shown in FIG. 8. For example, recession of the permalloy poles and the $Al_2O_3$ gap material is reduced relative to the recession of the $Al_2O_3$ body. Table 2 illustrates the pole tip recess and statistical data for a sample of sliders according to one embodiment of the present invention (in the column labeled "Present Invention"). It will be noted that the average and maximum pole tip recession for the sliders manufactured according to the present invention are significantly smaller, and the distribution of pole tip recession tighter, as compared to sliders manufactured according to the prior art.

TABLE 2

| | Prior Art<br>0.1 µm diamond particle abrasives<br>Standard lapping | | Present Invention<br>0.25 µm diamond particles abrasives<br>Linear (X–Y) lapping | |
|---|---|---|---|---|
| | Pole Tip Recession | | | |
| | $Al_2O_3$ (Ave.) | Total (Ave.) | $Al_2O_3$ (Ave.) | Total (Ave.) |
| | 437 | 396 | 79 | 97 |
| | 350 | 345 | 108 | 176 |
| | 439 | 438 | 66 | 71 |
| | 363 | 353 | 64 | 24 |
| | 431 | 433 | 85 | 148 |
| | 539 | 543 | 44 | 31 |
| | 354 | 320 | 110 | 141 |
| | — | — | 99 | 113 |
| Average | 416 | 404 | 82 | 100 |
| Std. Dev. | 67 | 76 | 23 | 55 |
| Minimum | 350 | 320 | 44 | 24 |
| Maximum | 539 | 543 | 110 | 176 |
| Distribution. | 189 | 223 | 66 | 152 |

The consequences of the surface scratches and microtexture discussed above are a reduced stiction and improved CSS performance. As has been previously discussed, FIG. 10 shows a typical CSS test result, performed on a 130 mm diameter thin film recording media with a sputtered carbon overcoat and lubricated with about 2 to 3 nm of perfluoropolyether lubricant. The used to generate the data for FIG. 10 was prepared by conventional prior art diamond particle lapping. The general increase in the slope in FIG. 10 indicates an increase in friction due to wear as the number of cycles increases. The jaggedness of the curve represents widely varying stiction values from cycle to cycle.

Using the typical requirement that the stiction coefficient, defined as the ratio of stiction value to normal load, be less than 1.0, the above test of FIG. 10 would be a failure if the stiction value increased beyond 11 grams at any time up to 20,000 CSS cycles (applied slider load of 11 grams). Since the stiction shown in FIG. 10 increased to more than 30 grams in less than 5000 cycles, the CSS performance of this slider is clearly unacceptable.

It is believed that the poor CSS performance for the slider of FIG. 10, prepared in accordance with the prior art, is due in part to weakened material dislodging from the part of the ABS damaged during diamond lapping. The dislodged particles become entrapped between the ABS and disk surface and cause accelerated abrasive wear to occur. Although the slider ABS was nominally lapped to a very high smoothness with diamond lapping, there is still considerable surface and sub-surface crystalline damage to the slider ABS. Sub-surface damage is a common consequence of most lapping processes.

A critical distinction should be made between prior art slider "lapping" and the slider "condition-lapping" of the present invention. Whereas, slider lapping of the prior an achieves the desirable ABS geometry and obtains as smooth an ABS as possible, slider condition-lapping refers to mechanical treatment to obtain the desirable ABS geometry while also obtaining a predetermined surface texture and the preferential removal of damaged material at the ABS. The fact that the prior art lapping processes produce a smooth ABS, but do nothing to inhibit material dislodging from the ABS during use illustrates this difference.

With reference now to FIG. 11, there is shown therein the CSS performance of a condition-lapped slider according to the present invention. The consequences on the CSS performance of the differences between the slider lapping of the prior art and the slider condition-lapping according to the present invention is shown by comparing the CSS performance illustrated in FIG. 10 to that illustrated in FIG. 11. The testing conditions were substantially the same for each of FIGS. 10 and 11. It can be seen that the CSS performance for the slider according to the present invention was significantly improved over that of the prior art slider. FIG. 10 indicates a peak stiction of approximately 33 grams after about 4750 cycles for the prior art slider. FIG. 11 indicates a peak stiction of approximately 5 gram after about 5000 cycles. Furthermore, the stiction remained virtually constant over the full 5000 cycles, compared to the dramatic increase in stiction over time for the prior art slider.

A key feature of the diamond abrasive in the condition-lapping process of the slider ABS, is that the particles making up the charged surface have sharp diamond crystalline features which protrude from the surface of the lapping plate, and since they are monocrystalline particles, do not fracture or cleave. These features act as abrasive "points" or contacts to mechanically and selectively grab and remove the damaged material from the ABS surface.

It has been determined that diamond embedded rope does not provide the same condition-lapping effects as the Glazing Plate described above. A slider of the type described above was stroked over 0.5 micron diamond particles embedded on a tape for approximately 4750 cycles over a 12.7 millimeter stroke distance. FIG. 12 shows the CSS performance of this slider. The high stiction values and a large modulation shown in FIG. 12 indicate that the resulting slider produces greater wear of the disk than a slider produced by the condition-lapping process with a glazed plate described above. Specifically, after 1000 CSS cycles, stiction rose to a value of over 10 grams. One probable reason for this difference may be that the abrasive particles are not well affixed to the tape backing, and thus break loose of the tape backing, and are not flushed away from the tape/ABS interface. Consequently, they provide a lesser degree of conditioning than the condition-lapping described above. It should be noted, however, that the CSS performance of this slider was improved over that of sliders lapped according to the teachings of the prior art.

In order to determine the effect of particle size on CSS performance for abrasive particle tape, 0.1 micron diamond particles were embedded on a tape, and a 12.7 nm stroke distance was used to lap a slider. The data from this test is shown in FIG. 13. The CSS test was terminated at about 1000 cycles because the stiction had already rapidly increased, reaching a value of 18 grams. Conditions for FIG. 14 were the same as for FIG. 13, except that during lapping, water and ethylene glycol were applied to the tape as a lubricant. It is generally believed that lubricants make cutting action of an abrasive more gentle. However, the CSS results proved to be almost as bad as those of FIG. 13, and the test was terminated after about 2000 cycles. These CSS results imply that according to known methods, even a very fine particle size diamond leaves a significant amount of damage at the slider surface with the consequent dislodging of ABS material.

The sub-surface damage expected from prior art diamond lapping is illustrated schematically in cross section in FIGS. 15 and 16. (It should be noted that FIGS. 15, 16, and 17 are schematic, and the features shown therein are exaggerated and not to scale.) In the $Al_2O_3$—TiC slider body 50 shown in FIG. 15, the TiC crystals are indicated by regions 52, and the $Al_2O_3$ is indicated at 54. A typical volume fraction of $Al_2O_3$ to TiC in an $Al_2O_3$—TiC slider is 70%/30%. This composite material is obtained by high temperature sintering, and hence the strength of bonding at the intergrain boundary between the two phases is generally weaker than bonding of the bulk material. Material at the grain boundaries can be weakened further by the effects of strain from Rough or Finish Lap using free or loosely embedded diamond abrasives. A microfracture is represented at 56 and an area where the two phases (TiC 52 and $Al_2O_3$ 54) are only weakly bound together at the ABS are shown at 58.

The phenomenon which is believed to cause the friction problem is further illustrated in FIG. 16, where particles 64 were dislodged from the ABS during use, leaving behind voids 66. Particles 64 become trapped at the disk/ABS interface, contributing to excessive abrasive wear of overcoat 70, which creates regions of flat spots 72, which ultimately lead to an increase in stiction. The trapped particles 64 between the ABS and the disk surface cause accelerated abrasive action which tends to wear away overcoat 70.

The result of the condition-lapping of the slider ABS according to the present invention is shown in FIG. 17, where portions of weakly bound or damaged material have been abrasively removed, leaving behind a surface with high mechanical integrity. Since the TiC phase is harder than the $Al_2O_3$ phase, it is thought that the TiC phase protrudes somewhat from the slider surface, although damaged or weakly bound TiC phase material as well as damaged or weakly bound $Al_2O_3$ phase material is also removed by the condition-lapping process.

In order to create a micro-texture on the ABS according to this invention, some surface damage should be incurred by the ABS from the diamond lapping. (In fact, in appropriate cases steps may be taken whose primary or secondary purpose is to impart such damage to the ABS.) This is a significant advantage, since the slider ABS does not have to be lapped to a very fine smoothness in multiple steps (in fact, in some cases the ABS may be rougher following condition-lapping than before). Fewer steps with larger particles can be used to quickly shape the slider geometry, while simultaneously taking steps to minimize wear and improve stiction performance. Since fewer steps are involved, the ABS geometry of parts produced will have a tighter distribution to specifications and more uniform quality. The size and depth of the micro-texture should be adjustable through proper selection of diamond particle abrasives, the size and type of grains present in the slider material, and the condition-lapping parameters.

Materials other than diamond may be used as the particulate abrasive in the condition-lapping process. However, the harder the material, the more advantageous the process. That is, the goal is to lap the ABS while at the same time removing the damaged or weakly bound material from its surface while causing a minimum amount of additional surface and subsurface damage and pole tip recession. Since a harder material will resist damage from lapping faster than a soft material, the lapping rate will be faster for the harder material, and thus the harder material is desirable.

When the slider body is a mixed matrix of different material, a general principle to follow is that theoretical hardness (i.e., bulk hardness) of the abrasive particles should preferably be about 20% harder than the theoretical Knoop hardness of the hardest phase of the slider material. If the abrasive particles are significantly softer than this general principle's limit, additional steps and/or time may be required to create the desired ABS geometry.

Another consideration in the case of dual phase material is the relative grain size of each phase. Since the abrasive particles must act on individual grains of the phase, the size of the abrasive particles should be preferably similar to the grain sizes of the two phases.

The foregoing description of our invention is merely illustrative, and those skilled in the art will appreciate, in light of the present disclosure, that various modifications may be made without departing from the spirit and scope of the present invention. For example, the present invention can be practiced on sliders made of materials other than $Al_2O_3$. Furthermore, the present invention can be practiced with magnetic or similar transducers for use with other than rigid media, such as tape or floppy disk heads. Therefore, the disclosures and descriptions herein are illustrative, and are not intended to be in any sense limiting.

What is claimed is:

1. A method of mechanically treating an air bearing surface of a magnetic recording head slider of a type having material which is damaged and weakly bound to the slider as well as material which is undamaged and securely bound to the slider at least at the air bearing surface, so as to condition-lap the air bearing surface, comprising the steps of:

embedding into a surface of a lapping plate a particulate abrasive material;

cleaning the lapping plate such that any particles of the particulate abrasive material not embedded in the lapping plate sufficient to remain embedded during lapping are removed from the surface of the lapping plate;

introducing a carrier onto the surface of the lapping plate so as to flush out any particulate matter generated during the lapping process; and condition-lapping the air bearing surface by bringing the air bearing surface into moving mechanical contact with the surface of the lapping plate such that the air bearing surface is lapped to provide a predetermined desired crown and micro-texture, while simultaneously preferentially removing from at least the air bearing surface the damaged and weakly bound material while leaving material which is not lapped and undamaged and securely bound to the slider substantially intact, thereby resulting in an air bearing surface exhibiting reduced friction and stiction.

2. The method of claim 1, wherein the particulate abrasive material is monocrystalline diamond particles.

3. The method of claim 2, wherein said diamond particles have an average size of between 0.1 micron and 0.25 micron.

4. The method of claim 1, wherein the motion of the moving mechanical contact of the condition lapping step is a predominantly linear motion.

5. The method of claim 1, wherein the air bearing surface has a longitudinal axis, and wherein the motion of the moving mechanical contact of the condition lapping step is predominantly linearly in the direction of the longitudinal axis of the air bearing surface.

6. The method of claim 1, wherein said micro-texture has a roughness Ra between about 1.0 and 5.0 nm, due at least in part to the preferential removal from at least the air bearing surface of the damaged and weakly bound material in the condition-lapping step.

7. The method of claim 1, wherein said air bearing surface is composed of grains of slider material, and further wherein the particulate abrasive material comprises particles having a grain size no larger than the grains of the slider material.

8. The method of claim 1, wherein the preferential removal of the damaged and weakly bound material results in the formation of voids in the air bearing surface, said voids being at least 1 nm in depth.

9. The method of claim 1, wherein the air bearing surface of the magnetic recording head slider is first lapped by mechanically abrading the air bearing surface with diamond particles having a diameter of approximately 1.0 micron applied between the air bearing surface and a lapping plate so as to define a throat height of the magnetic recording head slider.

10. The method of claim 2, wherein said step of condition-lapping further comprises the step of mating the magnetic recording head slider to an elastic surface for retaining the slider during said step of condition-lapping.

11. The method of claim 1, wherein the air beating surface is rougher following the step of conditioning-lapping than before said step.

12. The method of claim 1, wherein said step of conditioning-lapping is accomplished while substantially avoiding increasing the extent of surface or subsurface damage to said slider.

13. The method of claim 1, wherein the air bearing surface is condition-lapped with a pole tip recession of less than 200 Å.

14. The method of claim 1, wherein a pressure of between 30 and 70 psi is applied between the air bearing surface and the surface of the lapping plate during condition-lapping.

15. The method of claim 14, wherein a pressure of approximately 50 psi is applied between the air bearing surface and the surface of the lapping plate during condition-lapping.

16. A method of mechanically treating an air bearing surface of a magnetic recording head slider, the air bearing surface having a longitudinal axis, and the slider consisting of a matrix of grains, said matrix including material which is damaged and mechanically weakly bound to the air bearing surface as well as material which is undamaged and securely bound at least at the air bearing surface, so as to condition-lap the air bearing surface, comprising the steps of:

- embedding into the surface of a lapping plate monocrystalline diamond abrasive particles having an average size of between 0.1 micron and 0.25 micron;
- cleaning the lapping plate such that any particles of the diamond abrasive not embedded in the lapping plate sufficient to remain embedded during lapping are removed from the surface of the lapping plate;
- introducing a carrier onto the surface of the lapping plate so as to flush out any loose particulate matter generated during the lapping process; and
- conditioning-lapping the air bearing surface by mechanically movably coupling the air bearing surface with the surface of the lapping plate with a continuous force of at least 50 psi such that the air bearing surface is translated in a direction primarily parallel to the longitudinal axis of the air bearing surface, the conditioning-lapping providing the air bearing surface with a predetermined desired crown and a microtexture roughness comprising voids in the ABS of between 1.0 and 5.0 nm in depth, while simultaneously preferentially removing from the air bearing surface the damaged and mechanically weakly bound material while leaving unlapped material and the undamaged material substantially intact, thereby resulting in an air bearing surface exhibiting reduced friction and stiction.

17. The method of claim 16, wherein the air bearing surface has a longitudinal axis, and wherein the step of substantially removing further comprises moving the air bearing surface and the surface of the charging plate in mechanical contact with one another predominantly in the direction of the longitudinal axis of the air bearing surface while applying a lapping pressure of at least 50 psi.

18. The method of claim 17, wherein said step of substantially removing is accomplished while substantially avoiding creating further damaged regions in said slider.

19. A magnetic recording head slider manufactured by the method of claim 1.

20. A magnetic recording head slider manufactured by the method of claim 16.

* * * * *